(12) United States Patent
Calley

(10) Patent No.: US 7,868,511 B2
(45) Date of Patent: Jan. 11, 2011

(54) ELECTRICAL DEVICES USING DISK AND NON-DISK SHAPED ROTORS

(75) Inventor: David Gregory Calley, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 174 days.

(21) Appl. No.: 12/149,934

(22) Filed: May 9, 2008

(65) Prior Publication Data

US 2009/0206696 A1    Aug. 20, 2009

Related U.S. Application Data

(60) Provisional application No. 61/064,162, filed on Feb. 20, 2008, provisional application No. 61/064,161, filed on Feb. 20, 2008, provisional application No. 60/924,328, filed on May 9, 2007.

(51) Int. Cl.
*H02K 1/12* (2006.01)
(52) U.S. Cl. .................................... 310/257
(58) Field of Classification Search ............ 310/156.55, 310/216.004, 216.066, 216.067, 208, 257, 310/267–268, 49.15
See application file for complete search history.

(56) References Cited

U.S. PATENT DOCUMENTS 1,361,136 A    12/1920  Burke
2,078,668 A     4/1937  Kilgore (Continued)

FOREIGN PATENT DOCUMENTS

DE    1513856    4/1969

(Continued)

OTHER PUBLICATIONS

Hasubek, B. E. et al.; "Design Limitations of Reduced Magnet Material Passive Rotor Transverse Flux Motors Investigated using 3D Finite Element Analysis"; 2000; pp. 365-369.

(Continued)

*Primary Examiner*—Tran N Nguyen
(74) *Attorney, Agent, or Firm*—Snell & Wilmer L.L.P.

(57) ABSTRACT

Various devices for generating electrical or mechanical output, comprising a coil, a rotor assembly rotatable about an axis, the rotor comprising alternating magnet portion and flux conducting portions, each of the magnet portions having a first end with a first polarity and a second end with the opposite polarity and oriented along the periphery such that the first end of each magnet portion points toward the first end of the previous magnet portion and the second end of each magnet portion points toward the second end of the next magnet portion, a stator assembly having first and second sets of stator flux conductor extensions, each of the stator flux conductor extensions having a stator surface facing the rotor, wherein rotating the rotor assembly about the axis alternates the rotor assembly between a first and a second position, causing magnetic flux to flow. The stator and the rotor may be reversed in operation. Other variations are presented, including multiple geometries for both the permanent magnets and the flux conductive portions of the invention. A means of coupling the invention to an exterior device or apparatus is also discussed, as are ways to control the output of the device.

36 Claims, 33 Drawing Sheets

U.S. PATENT DOCUMENTS

| | | |
|---|---|---|
| 3,403,273 A | 9/1968 | Hiroshi |
| 3,437,854 A | 4/1969 | Oiso |
| 3,558,941 A | 1/1971 | Visconti Brebbia et al. |
| 3,700,942 A | 10/1972 | Alth |
| 3,710,158 A | 1/1973 | Bachle et al. |
| 3,774,059 A | 11/1973 | Cox |
| 4,021,691 A | 5/1977 | Dukshtau et al. |
| 4,114,057 A | 9/1978 | Esters |
| 4,206,374 A | 6/1980 | Goddijn |
| 4,237,396 A | 12/1980 | Blenkinsop et al. |
| 4,255,684 A * | 3/1981 | Mischler et al. ....... 310/216.031 |
| 4,363,988 A | 12/1982 | Kliman |
| 4,388,545 A | 6/1983 | Honsinger et al. |
| 4,392,072 A * | 7/1983 | Rosenberry .......... 310/216.067 |
| 4,459,501 A | 7/1984 | Fawzy |
| 4,501,980 A | 2/1985 | Welburn |
| 4,605,874 A | 8/1986 | Whiteley |
| 4,611,139 A | 9/1986 | Godkin et al. |
| 4,620,752 A | 11/1986 | Fremerey et al. |
| 4,658,166 A | 4/1987 | Oudet |
| 4,794,286 A | 12/1988 | Taenzer |
| 4,797,602 A * | 1/1989 | West .......................... 322/10 |
| 4,835,840 A | 6/1989 | Stokes |
| 4,850,100 A | 7/1989 | Stokes |
| 4,900,965 A | 2/1990 | Fisher |
| 4,959,577 A | 9/1990 | Radomski |
| 5,038,066 A | 8/1991 | Pawlak et al. |
| 5,051,641 A | 9/1991 | Weh |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd |
| 5,208,503 A * | 5/1993 | Hisey .................. 310/216.054 |
| 5,212,419 A | 5/1993 | Fisher et al. |
| 5,250,865 A | 10/1993 | Meeks |
| 5,262,746 A * | 11/1993 | Masuda ...................... 336/192 |
| 5,278,470 A | 1/1994 | Neag |
| 5,289,072 A | 2/1994 | Lange |
| 5,306,977 A | 4/1994 | Hayashi |
| 5,382,859 A | 1/1995 | Huang et al. |
| 5,386,166 A | 1/1995 | Reimer et al. |
| 5,530,308 A * | 6/1996 | Fanning et al. .............. 310/208 |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,712,521 A | 1/1998 | Detela |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,886,449 A | 3/1999 | Mitcham |
| 5,889,348 A | 3/1999 | Múhlberger et al. |
| 5,894,183 A | 4/1999 | Borchert |
| 5,925,965 A | 7/1999 | Li et al. |
| 5,942,828 A | 8/1999 | Hill |
| 5,973,436 A | 10/1999 | Mitcham |
| 5,994,802 A | 11/1999 | Shichijyo et al. |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,126 A | 8/2000 | Takura |
| 6,121,712 A | 9/2000 | Sakamoto |
| 6,133,655 A | 10/2000 | Suzuki et al. |
| 6,133,669 A | 10/2000 | Tupper |
| 6,137,202 A * | 10/2000 | Holmes et al. .............. 310/180 |
| 6,154,013 A | 11/2000 | Caamano |
| 6,163,097 A | 12/2000 | Smith et al. |
| 6,177,748 B1 | 1/2001 | Katcher et al. |
| 6,181,035 B1 | 1/2001 | Acquaviva |
| 6,194,799 B1 | 2/2001 | Miekka |
| 6,229,238 B1 | 5/2001 | Graef |
| 6,232,693 B1 | 5/2001 | Gierer et al. |
| 6,236,131 B1 | 5/2001 | Schafer |
| 6,300,702 B1 | 10/2001 | Jack et al. |
| 6,365,999 B1 | 4/2002 | Múuhlberger et al. |
| 6,445,105 B1 | 9/2002 | Kliman et al. |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,545,382 B1 | 4/2003 | Bennett |
| 6,603,060 B1 | 8/2003 | Cammano |
| 6,603,237 B1 | 8/2003 | Caamano |
| 6,657,329 B2 | 12/2003 | Kastinger et al. |
| 6,664,704 B2 | 12/2003 | Calley |
| 6,707,208 B2 | 3/2004 | Durham et al. |
| 6,717,297 B2 | 4/2004 | Sadarangani et al. |
| 6,774,512 B2 | 8/2004 | Takagi et al. |
| 6,794,791 B2 | 9/2004 | Ben Ahmed et al. |
| 6,815,863 B1 | 11/2004 | Jack et al. |
| 6,849,985 B2 | 2/2005 | Jack et al. |
| 6,853,112 B2 | 2/2005 | Nakamura et al. |
| 6,867,530 B2 | 3/2005 | Gamm et al. |
| 6,879,080 B2 | 4/2005 | Cammano |
| 6,885,129 B1 | 4/2005 | Oohashi et al. |
| 6,924,579 B2 | 8/2005 | Calley |
| 6,940,197 B2 | 9/2005 | Fujita et al. |
| 6,949,855 B2 | 9/2005 | Dubois et al. |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Cammano |
| 7,064,469 B2 | 6/2006 | Jack et al. |
| 7,067,954 B2 | 6/2006 | Kuribayashi et al. |
| 7,071,593 B2 * | 7/2006 | Matsushita et al. .......... 310/257 |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,230,361 B2 | 6/2007 | Hirzel |
| 7,245,055 B2 | 7/2007 | Jack |
| 7,250,704 B1 * | 7/2007 | Sortore et al. ............... 310/208 |
| 7,358,639 B2 | 4/2008 | Cammano |
| 7,385,329 B2 | 6/2008 | Hill |
| 7,385,330 B2 | 6/2008 | Trzynadlowski et al. |
| 7,420,312 B2 * | 9/2008 | Kitamura et al. ............ 310/263 |
| 7,466,057 B2 | 12/2008 | Imai et al. |
| 7,592,735 B2 | 9/2009 | Hamada |
| 7,602,095 B2 | 10/2009 | Kusase |
| 2001/0001528 A1 | 5/2001 | Ragaly |
| 2001/0030479 A1 | 10/2001 | Mohler |
| 2001/0030486 A1 * | 10/2001 | Pijanowski ................. 310/254 |
| 2002/0070627 A1 | 6/2002 | Ward et al. |
| 2002/0135242 A1 | 9/2002 | Kawai |
| 2003/0122439 A1 | 7/2003 | Horst |
| 2003/0122440 A1 | 7/2003 | Horst |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0212267 A1 | 10/2004 | Jack et al. |
| 2004/0232799 A1 | 11/2004 | Chen et al. |
| 2004/0251759 A1 | 12/2004 | Hirzel |
| 2004/0251761 A1 | 12/2004 | Hirzel |
| 2004/0262105 A1 | 12/2004 | Li et al. |

| | | | |
|---|---|---|---|
| 2005/0006978 | A1 | 1/2005 | Bradfield |
| 2005/0012427 | A1 | 1/2005 | Seki et al. |
| 2005/0062348 | A1 | 3/2005 | Ohnishi et al. |
| 2005/0121983 | A1 | 6/2005 | Ehrhart |
| 2005/0156479 | A1 | 7/2005 | Fujita et al. |
| 2005/0242679 | A1 | 11/2005 | Walter et al. |
| 2006/0012259 | A1 | 1/2006 | Kerlin |
| 2006/0012263 | A1 | 1/2006 | Smith et al. |
| 2006/0082237 | A1 | 4/2006 | Kerlin |
| 2006/0091755 | A1 | 5/2006 | Carlisle |
| 2006/0131974 | A1 | 6/2006 | Sadarangani et al. |
| 2006/0131986 | A1 | 6/2006 | Hsu et al. |
| 2006/0192453 | A1 | 8/2006 | Gieras et al. |
| 2006/0220477 | A1 | 10/2006 | Okumoto et al. |
| 2006/0261688 | A1 | 11/2006 | Akita et al. |
| 2007/0013253 | A1 | 1/2007 | Dubois et al. |
| 2007/0046137 | A1 | 3/2007 | Ooiwa |
| 2007/0046139 | A1 | 3/2007 | Ishizuka |
| 2007/0075605 | A1 | 4/2007 | Enomoto et al. |
| 2007/0138900 | A1 | 6/2007 | Imai et al. |
| 2007/0152528 | A1 | 7/2007 | Kang et al. |
| 2007/0176505 | A1 | 8/2007 | Trzynadlowski et al. |
| 2008/0007126 | A1* | 1/2008 | Popov et al. .............. 310/49 R |
| 2008/0169776 | A1 | 7/2008 | Acker |
| 2008/0211326 | A1 | 9/2008 | Kang et al. |
| 2008/0265707 | A1 | 10/2008 | Bradfield |
| 2008/0309188 | A1* | 12/2008 | Calley ................... 310/156.07 |
| 2008/0315700 | A1 | 12/2008 | Ishikawa et al. |
| 2009/0160288 | A1* | 6/2009 | Calley ........................ 310/257 |
| 2009/0243406 | A1 | 10/2009 | Jack et al. |

FOREIGN PATENT DOCUMENTS

| | | |
|---|---|---|
| DE | 6326149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0 544 200 A1 | 11/1992 |
| EP | 0707374 | 4/1996 |
| EP | 0718959 | 6/1996 |
| EP | 0998010 | 3/2000 |
| EP | 1117168 | 7/2001 |
| EP | 1227566 | 7/2002 |
| EP | 1 063 754 B1 | 12/2007 |
| GB | 518298 | 9/1938 |
| GB | 2052176 | 1/1986 |
| JP | 60-241758 A | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO 2009116935 | 9/2009 |
| WO | WO 2009116936 | 9/2009 |
| WO | WO 2009116937 | 9/2009 |

OTHER PUBLICATIONS

Henneberger G. et al.; "On the Parameters Computation of a Single Sided Transverse Flux Motor"; May 26, 2001; pp. 35-40.
Husband, S.M. et al.; "The Rolls-Royce Transverse Flux Motor Development"; 2003; pp. 1435-1440.
Notice of Allowance dated Mar. 29, 2005 for U.S. Appl. No. 10/721,765.
Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Office Action dated Sep. 28, 2007 for U.S. Appl. No. 11/679,806.
Notice of Allowance dated Dec. 30, 2009 for U.S. Appl. No. 12/149,931.
Office Action dated Sep. 13, 2004 for U.S. Appl. No. 10/721,765.
ISR/WO dated Aug. 15, 2008 for International Patent Application No. PCT/US2008/063301.
IPRP dated Nov. 10, 2009 for International Patent Application No. PCT/US2008/063301.
ISR/WO dated Aug. 20, 2008 for International Patent Application No. PCT/US2008/063236.
IPRP dated Nov. 17, 2009 for International Patent Application No. PCT/US2008/063236.
ISR/WO dated Oct. 24, 2008 for International Patent Application No. PCT/US2008/063336.
IPRP dated Nov. 17, 2009 for International Patent Application No. PCT/US2008/063336.
ISR/WO dated Aug. 15, 2008 for International Patent Application No. PCT/US2008/063287.
IPRP dated Nov. 10, 2009 for International Patent Application No. PCT/US2008/063287.
ISR/WO dated Nov. 10, 2009 for International Patent Application No. PCT/US2008/063268.
IPRP dated Nov. 10, 2009 for International Patent Application No. PCT/US2008/063268.
Technical Project Presentation—Development of a High-Performance Generator for Wind Turbines—Final Report—University of Nevada, Reno—Feb. 2004.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.
"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.
"Analytical Interpretation and Quantification of Rotational Losses in Stator Cores of Induction Motors",—IEEE Transactions on Magnetics, vol. 43, No. 10, Oct. 2007, retrieved Jan. 8, 2010.
Office Action dated Nov. 30, 2009 for U.S. Appl. No. 12/149,935.
Theory of SR Motor Operation (Power Point Presentation), copyright 2002 by George Holling and Rocky Mountain Technologies Inc.
Development of a PM Transverse Flux Motor With Soft Magnetic Composite Core—IEEE Transactions on Energy Conversion, vol. 21, No. 2., Jun. 2006.
www.higenmotor.com/eng/aboutus/about06read.asp?id=notice&no=87 dated Jan. 15, 2010.
Lyng Eltorque QT 800-2.0 User Manual, version 1.0—dated Jul. 3, 2007.
Motors: Emerging Concepts by George Holling, Apr. 2007.
www.iem.rwth-aachen.de/index.pl/new materials and machines?makePrintable=1; retrieved Jan. 15, 2010.
Wooler, T.J. et al.; "Analysis of the Yokeless and Segmented Armature Machine"; Electric Machines & Drives Conference; 2007; IEMDC; apos;07; IEEE International vol. 1; Issue; 3-5; May 2007; pp. 704-708.
Technical Project Presentation—Development of a High-Performance Generator for Wind Turbines—by Andrzej M. Trzynadlowski, PhD, University of Nevada, Reno, FIEEE, Aug. 2007.
"Magnetic Field Calculation of Claw Pole Permanent Magnet Machines Using Magnetic Network Method": J. Elect. Electron. Eng., Australia, vol. 22, No. 1, pp. 69-75, 2002.

"Iron Loss Calculation in a Claw-Pole Structure", by A. Reinap et al., Lund University, Jun. 2004.
Dubois, Maxine R. et al.; "Clawpole Transverse-Flux Machine with Hybrid Stator"; pp. 1-6, Jul. 15, 2006.
Fundamental Modeling for Optimal Design of Transverse Flux Motors—Genevieve Patterson et al., University of Tokyo, 2008.
Raser Technologies Company Brochure, 2005.
ISR and WO dated Jun. 10, 2010 for International Application No. PCT/US2009/063145.
ISR and WO dated Jun. 10, 2010 for International Application No. PCT/US2009/063142.
ISR and WO dated Jun. 18, 2010 for International Application No. PCT/US2009/063147.
Office Action dated Jul. 27, 2010 for U.S. Appl. No. 12/149,936.
Response to Office Action filed Jan. 15, 2010 for Japanese Patent Application No. 2003-548374.
Office Action dated Mar. 2, 2010 for U.S. Appl. No. 12/149,931.
Restriction Requirement dated Apr. 22, 2010 for U.S. Appl. No. 12/149,936.
Office Action dated Apr. 28, 2010 for U.S. Appl. No. 12/149,935.
Notice of Allowance dated May 4, 2010 for U.S. Appl. No. 12/149,931.
Office Action dated Aug. 9, 2010 for U.S. Appl. No. 12/611,733.
Notice of Allowance dated Aug. 12, 2010 for U.S. Appl. No. 12/611,728.
Notice of Allowance dated Aug. 19, 2010 for U.S. Appl. No. 12/611,737.
Notice of Allowance dated Oct. 6, 2010 for U.S. Appl. No. 12/149,935.

* cited by examiner

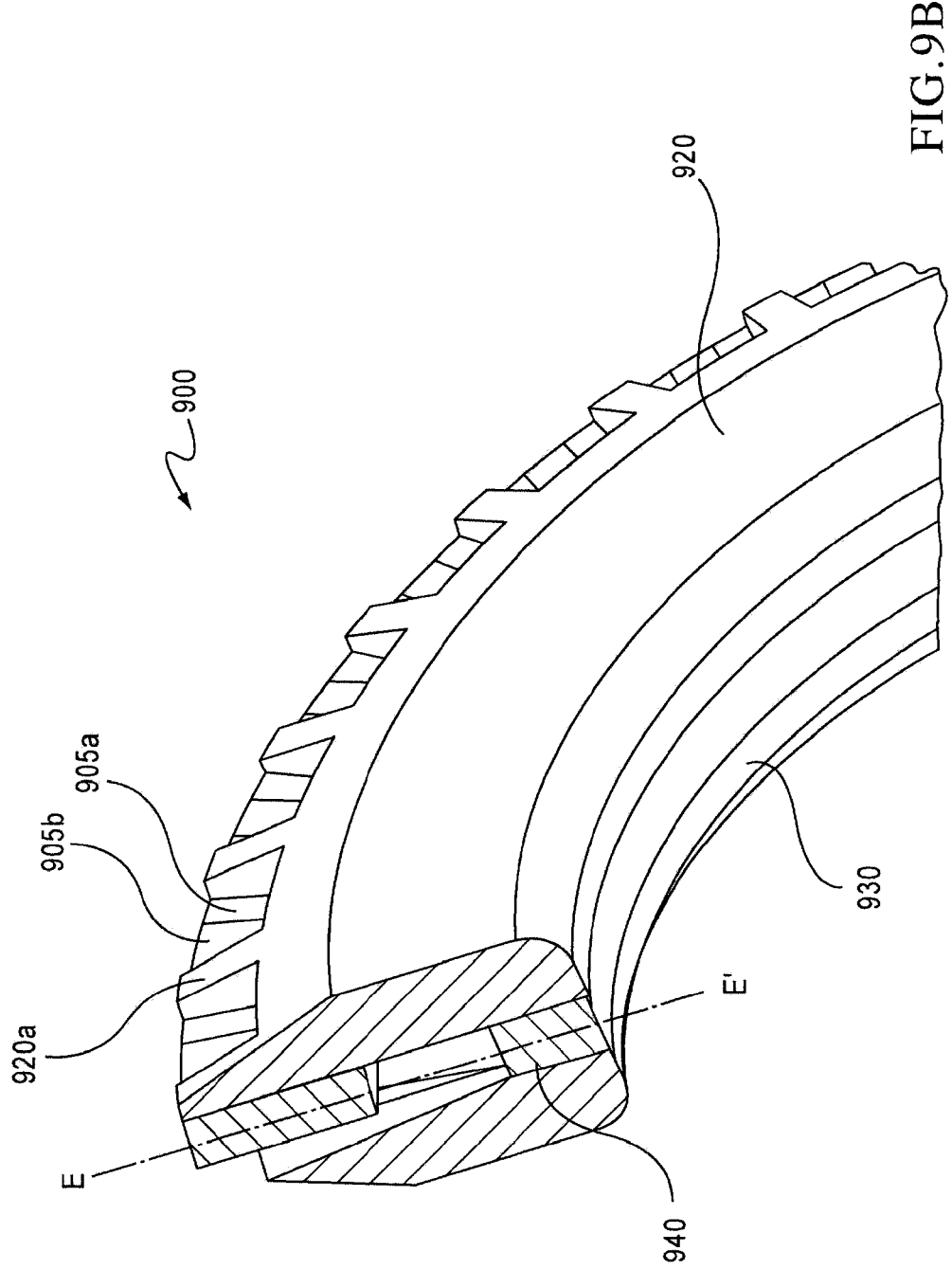

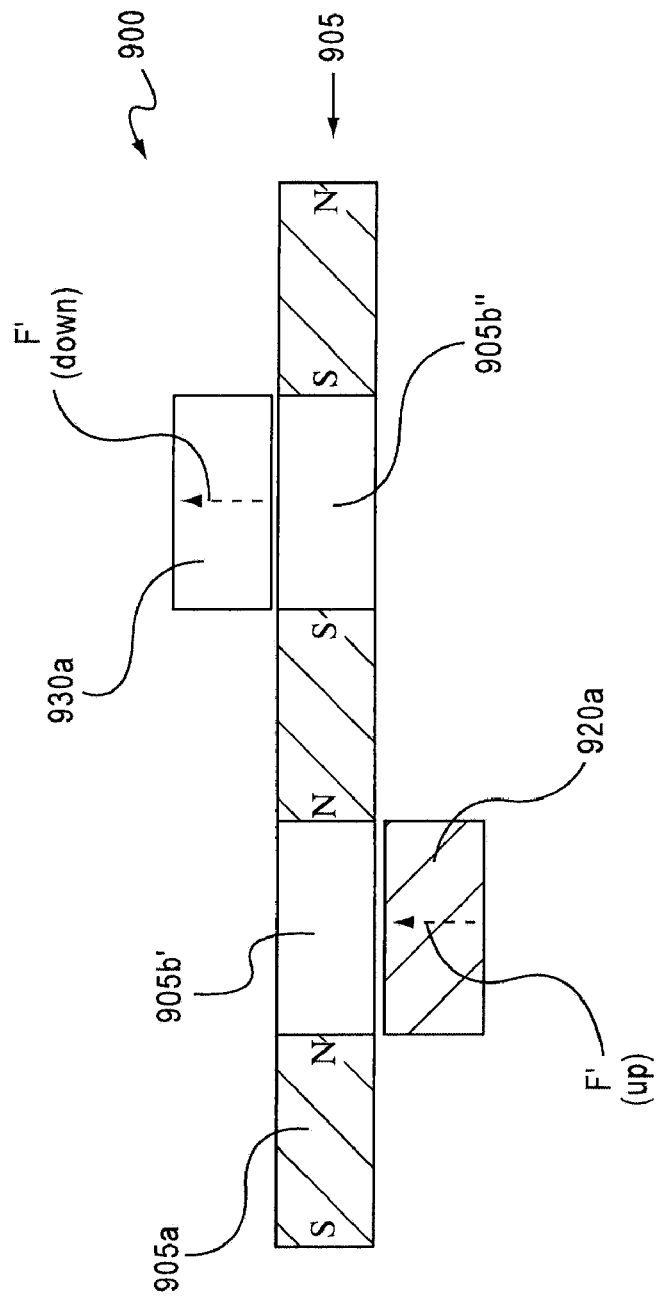

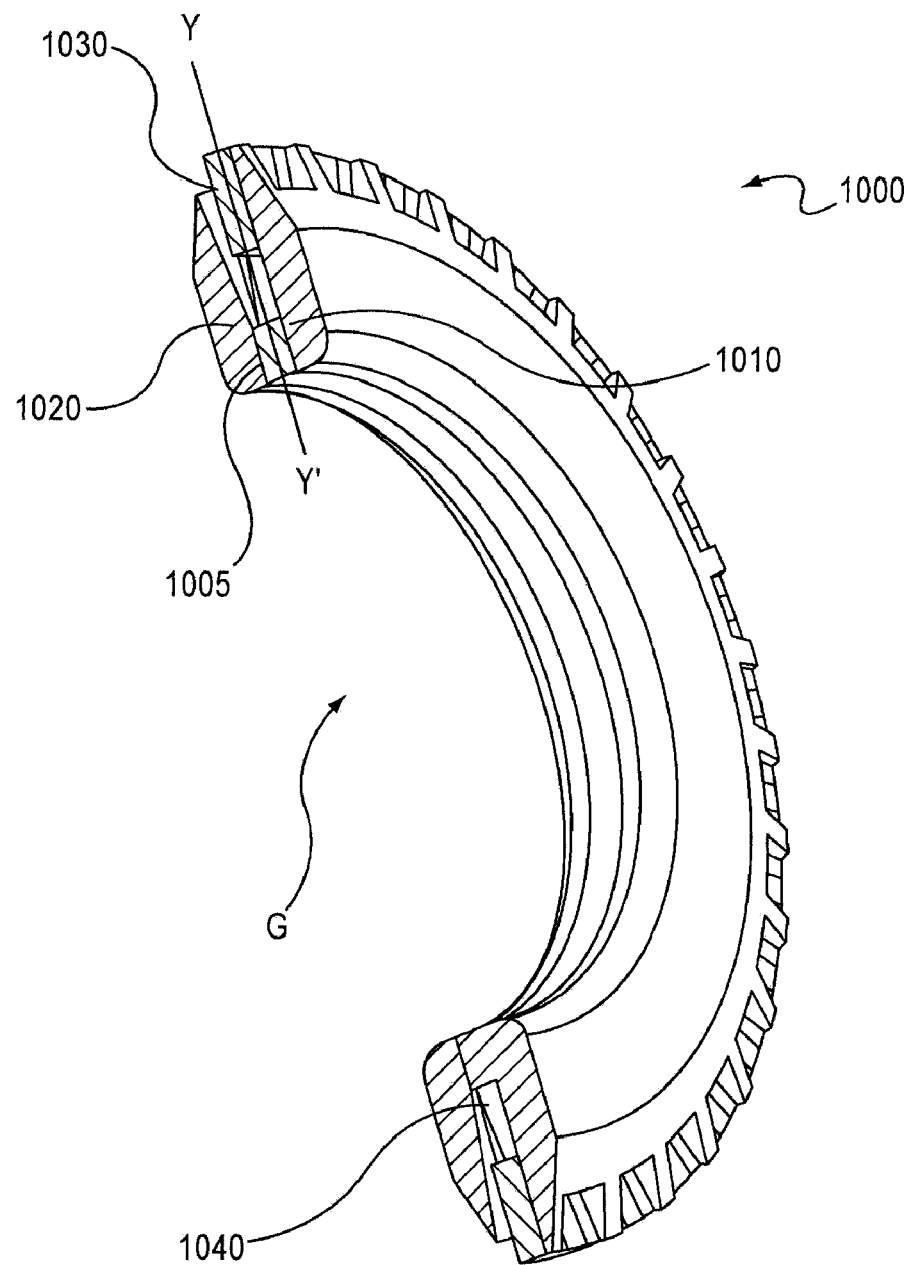

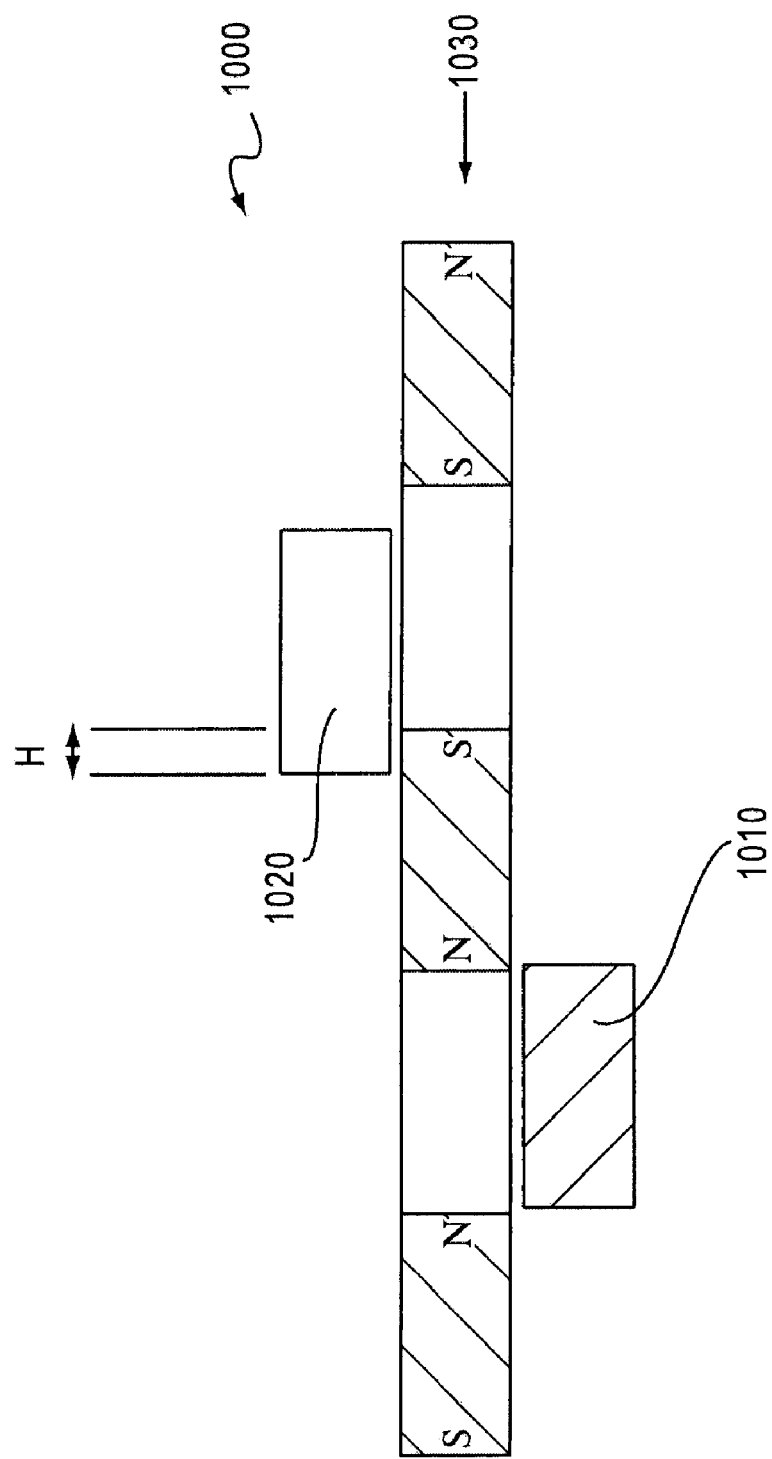

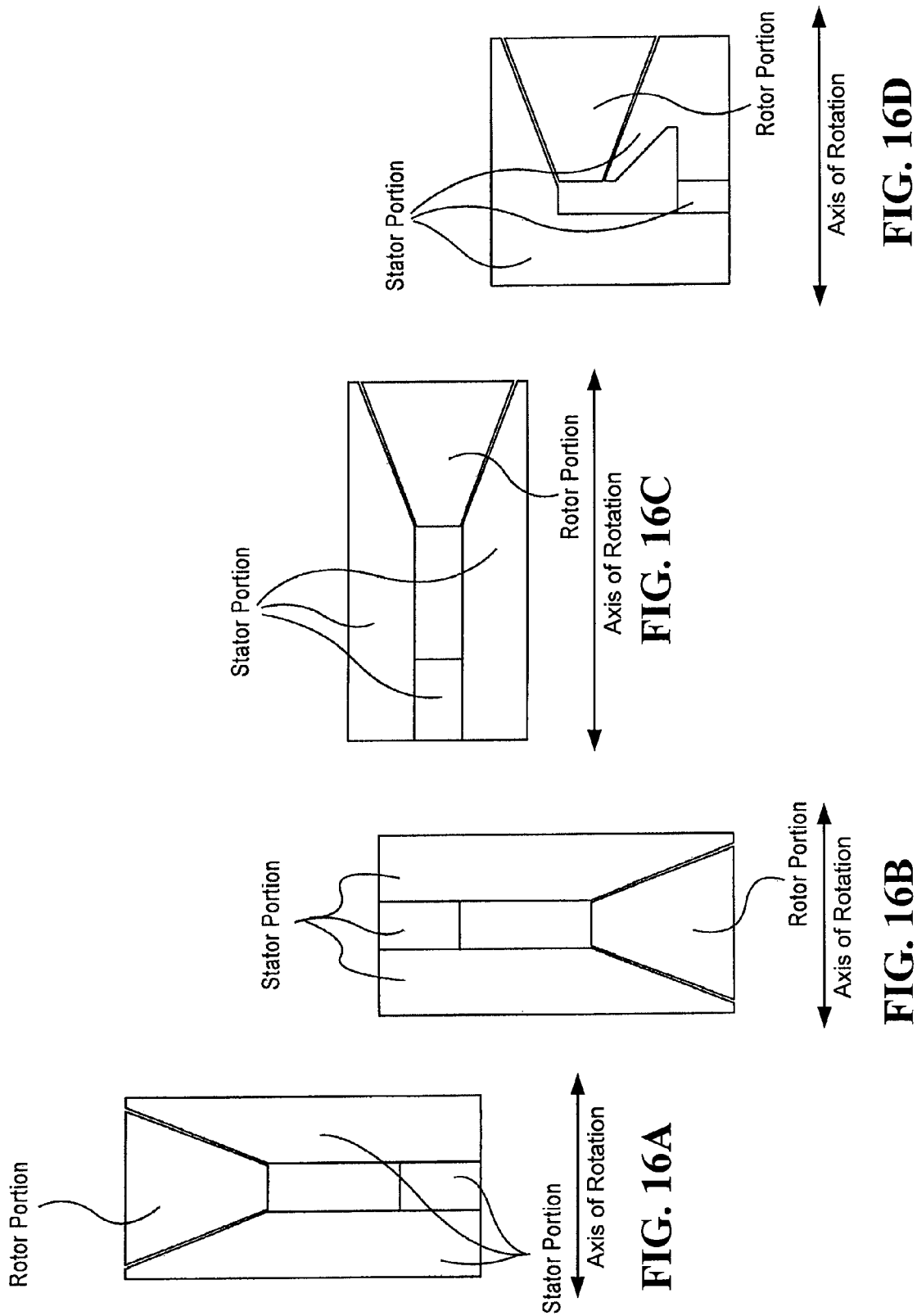

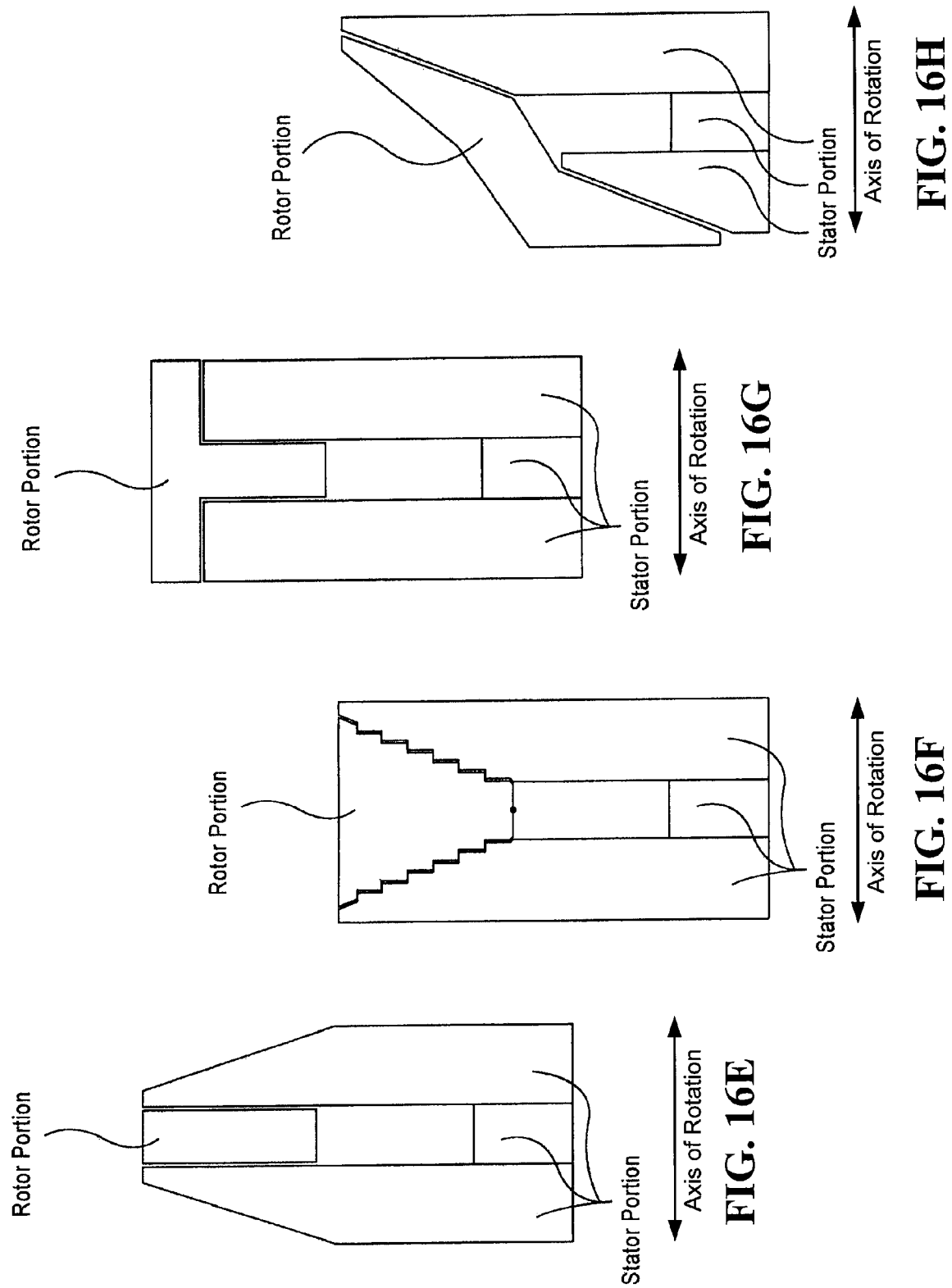

ELECTRICAL DEVICES USING DISK AND NON-DISK SHAPED ROTORS

This application is a non-provisional of and claims priority to Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, U.S. Provisional Patent Appl. No. 61/064,162 titled "ELECTRICAL OUTPUT GENERATING DEVICES AND DRIVEN ELECTRICAL DEVICES, AND METHODS OF MAKING AND USING THE SAME" filed Feb. 20, 2008, and U.S. Provisional Patent Appl. No. 61/064,161 titled "LAMINATE ROTOR OR STATOR ELEMENTS FOR ELECTRICAL OUTPUT GENERATING DEVICES AND DRIVEN ELECTRICAL DEVICES, AND METHODS OF MAKING AND USING SUCH ELEMENTS AND DEVICES" filed Feb. 20, 2008. This application is related to U.S. patent application Ser. No. 12/149,931, now U.S. Pat. No. 7,800,275, titled "ELECTRICAL DEVICES USING ELECTROMAGNETIC ROTORS" filed May 9, 2008, U.S. patent application Ser. No. 12/149,935, now U.S. Patent Application Publication No. 2008/0309188, titled "ELECTRICAL DEVICES WITH REDUCED FLUX LEAKAGE USING PERMANENT MAGNET COMPONENTS" filed May 9, 2008, U.S. patent application Ser. No. 12/149,936, now U.S. Patent Application Publication No. 2009/0206693, titled "ELECTRICAL DEVICES HAVING TAPE WOUND CORE LAMINATE ROTOR OR STATOR ELEMENTS" filed May 9, 2008, and U.S. patent application Ser. No. 12/149,933, now U.S. Patent Application Publication No. 2009/0208771, titled "POWDERED METAL MANUFACTURING METHOD AND DEVICES" filed May 9, 2008. The entirety of each of the foregoing applications is hereby incorporated by reference herein.

BACKGROUND OF THE INVENTION

1. Field of the Invention

Aspects of the present invention relate to the field of alternator or other electrical output generating devices and to electric motors and other electrically driven devices, and in particular to electrical output generating devices and electrically driven devices, and methods of making and use thereof, that, among other things, improve efficiency of operation, provide higher torque density, and reduce costs and complexity of manufacture, while allowing greater flexibility in operation over related art devices.

2. Background of the Technology

Related art multipole windings for alternators and electric motors typically require complex winding machines and often complex geometry windings in order to meet size and power needs. This problem is generally higher with greater numbers of poles used. Greater numbers of poles have certain advantages, such as allowing higher voltage per turn, providing higher torque density, and producing voltage at a higher frequency.

There is an unmet need in the art for electrical output generating devices and electrically driven devices, and methods of manufacturing and use thereof, that improve efficiency of operation and reduce costs and complexity of manufacture, while allowing greater flexibility in operation over prior art devices.

SUMMARY OF THE INVENTION

Particular variations of electrical output generating devices in accordance with aspects of the present application may satisfy one or more of the above identified needs, as well as others, by providing electrical output generating devices and electrically driven devices, and methods of making and use thereof, that, among other things, improve efficiency of operation and reduce costs and complexity of manufacture, while allowing greater flexibility in operation over related art devices. Further, aspects of the present invention provide other advantages, such as enabling higher torque density to be obtained, a wide speed range to be used, and allowing selectability in location of stationary windings (e.g., allowing any windings within the device to be stationary; among other things, this feature may allow or ease use of supercooling features; in addition, this feature may allow the use of slip rings or other similar features to be avoided), while allowing connection convenience for other purposes, such as to facilitate use in conjunction with superconducting windings.

Although variations shown herein generally have magnets on the rotator portion and flux conducting extensions on the stator, it should be noted that other, unshown configurations are also part of this invention. For example, flux conductive extensions can be mounted onto the rotor and a series of permanent magnets onto the stator portion substantially reversing another configuration shown herein. Alternatively, flux conductive extensions can be mounted onto the rotor and an electromagnet onto the stator portion substantially reversing a configuration shown herein. A number of other relationships between the stator and rotator are possible, not limited to mounting either the stator or the rotor as the exterior-most component or rearranging magnets and flux conductive extensions in order to conduct magnetic flux in such a way as to either generate electrical output or to drive the rotator. In addition, flux conductive extensions and either permanent or electromagnets can be mounted to the same component, i.e., to the rotor or stator assembly.

Particular aspects of the present invention provide a more economical to manufacture and/or more efficiently operating electrical output generating devices and electrically driven devices over related art devices. Among other things, some variations of the present invention overcome difficulties in manufacturing of many typical electrical output generating devices and electrically driven devices that use high numbers of and/or complex windings. In order to overcome problems with complex windings, among other things, aspects of the present invention provide for methods and features to allow flux paths to be used in operation, via flux conducting materials, rather than using complex winding paths.

In a first exemplary variation, a rotor portion having a plurality of magnetic of polar portions for conducting flux encompasses an input coil. The rotor is operated in conjunction with a plurality of flux conducting material portions in a stator portion that nestably encompasses the rotor portion. The relative positions of the stator and rotor may be moved relative to one another to change the gap therebetween, and, thus, to allow adjustment of power generated (for alternator operation, for example) or used/output for motor operation. The stator portion further encompasses an output coil portion. In the first exemplary variation, the rotor portion is moveable, such that corresponding flux conducting material portions may generally be variably located in close proximity to one another. Among other things, this arrangement allows both field and output coils to be small in diameter (e.g., thereby having lower resistance), while allowing the flux conductors to be positioned as far as possible from the rotational center of the device (e.g., thereby allowing larger poles for transmitting greater flux, with wider spacing so as to reduce flux leakage).

When operating as an electrical output device, energizing of the input coil portion produces travel of flux in a flux path, as the rotor is rotated, through the flux conducting portions of the rotor and stator, which, in turn, produces electrical output from the output coil portion; or, alternatively, when operated as an electrically driven device, the output coil portion is energized in a manner so as to produce motion of the rotor via the flux traveling in the flux path. Among other things, the use of flux conducting material portions in the stator, rather than wire coils of the related art, allows greater numbers of poles to be used more easily over related art using coils for transmitting flux, while minimizing complexity and other drawbacks of use of coils for this purpose.

Further, for example, the configuration of the first exemplary variation decouples the number of poles from the physical area required for windings. In the related art using multiple windings for poles, for example, if the pole count is increased, the corresponding area available for each phase (e.g., for windings) is decreased. In contrast, with the first exemplary variation of the present invention, the number of poles is not limited by restrictions on physical space for windings. Among other things, aspects of the present invention thereby allow much higher numbers of poles to be used (e.g., where optimal), with corresponding contribution to higher power density over related art approaches.

The configuration of the first exemplary variation also allows the length of the output wire for the windings, for example, to be much shorter than related art multiple winding approaches allow. This advantage is obtainable, for example, because such windings do not have to thread around each pole, but only around a central pole. Among other things, this additional advantage allows much lower resistance power coils to be achieved, thereby producing higher efficiency and further reducing cost over related art multiple winding devices.

A second exemplary variation of the present invention relates to a tape-like wound torroidal flux conducting material portion, and methods for making and use thereof, usable with electrical output generating devices and electrically driven devices. In some variations, the tape-like wound torroidal flux conducting material portion is placed within one or more coil portions of the electrical output generating devices and electrically driven devices, and constructed and oriented so as to minimize eddy current and/or other losses related to flux conduction.

In another exemplary variation of the present invention, the rotor portion and the stator portion each include flux conducting material, similar to the first variation, but, rather than the stator portion nestably encompassing the rotor portion, flux conducting material portions of the stator generally abut (e.g., at an oblique angle) the flux conducting material portions of the rotor at one or more radial distances from the axis of rotation of the rotor, so as, for example, potentially to reduce flux leakage and to provide other advantages over the first exemplary variation.

In another exemplary variation of the present invention, the device is generally disk type and includes a rotor portion nestably arranged at the periphery of the stator portion. The rotor portion includes alternating pairs of magnet portions, each pair sandwiching a flux conducting portion. The magnet portions are oriented such that edges of a single polarity from both sandwiching magnet portions abut the sandwiched conducting portion. The stator portion includes flux conducting portions oriented so as to align with the flux concentrating portions of the rotor and enable flux paths that produce output from an output coil when operated as an electrical output device; or, alternatively, when operated as an electrically driven device, the output coil portion is energized in a manner so as to produce motion of the rotor. Variations of the shape, composition, and methods of manufacture of the rotor flux conducting portions can ease construction and/or improve performance. Alignment for extensions and other features of the third exemplary variation may be used to address cogging and/or noise and/or efficiency, among other things.

Another exemplary variation of the present invention provides a flux concentrating rotor and stator design, and methods of making and use thereof, for disk-shaped electrical output generating devices and electrically driven devices and other applications that is similar to the first disk type variation, but includes features for allowing a first stator portion and a second stator portion to be rotated or otherwise shifted relative to one another, such that the timing of flux between the rotor and stator may be varied, thereby resulting in variation in output of the electrical output generating device or operation of the electrically driven device.

Yet other exemplary variations of the present invention relate to a generally disk type devices that are usable in conjunction with conventional alternator or other device applications for supplemental or alternative power applications. These variations generally include rotor portions rotating with pulley or other conventional device rotation, and operating in conjunction with stator portions, for example, fixably secured to a fixed portion of the conventional device. Usable with these exemplary variations is a variable output reduction feature that variably alters the flux paths of flux conducting portions so as to variably reduce device output (e.g., to limit output as needed at increasing rotational speed, where output would otherwise unnecessarily increase with speed).

Additional advantages and novel features relating to electrical output generating devices and/or electrically driven devices will be set forth in part in the description that follows, and in part will become more apparent to those skilled in the art upon examination of the following or upon learning by practice of aspects of the present invention.

BRIEF DESCRIPTION OF THE FIGURES

In the drawings:

FIGS. 9A and 9B illustrate views of an exemplary flux concentrating multiple pole rotor electrical output device or electrically driven device, in accordance with aspects of the present invention;

FIG. 9F shows a representative view of the electrical output device or electrically driven device of FIG. 9D at a slightly rotated rotor position relative to the position of FIG. 9D;

FIG. 10 presents another variation of a flux concentrating rotor similar to the variation shown in FIGS. 9A-9G; and FIG. 11 shows a representative view of the electrical output device or electrically driven device of FIG. 10 from a view perpendicular to the direction Y-Y' shown in FIG. 10.

FIGS. 16A-16K present cross-sectional views of several exemplary stator and rotor layouts, in accordance with aspects of the present invention;

DETAILED DESCRIPTION

Aspects of the present invention and implementations thereof, are not limited to the specific components or assembly procedures disclosed herein. Many additional components and assembly procedures known in the art consistent with the intended electrical output generating devices, electrically driven devices, and/or assembly procedures for electrical output generating devices and/or electrically driven devices will become apparent for use with particular variations and implementations described herein. Accordingly, for example, although particular electrical output generating devices and/or electrically driven devices are disclosed, such electrical output generating devices and/or electrically driven devices and implementing components may comprise any shape, size, style, type, model, version, measurement, concentration, material, quantity, and/or the like usable for such electrical output generating devices and/or electrically driven devices and implementing components, consistent with the intended operation of electrical output generating devices and/or electrically driven devices.

Description of exemplary variations and implementations of electrical output generating devices and/or electrically driven devices in accordance with aspects of the present invention will now be made with reference to the appended drawings.

Devices Using Flux Conducting Material Stator

FIGS. 1-3B present a first exemplary variation of various components of an electrical output device or electrically driven device and a method of operation thereof, in accordance with aspects of the present invention.

Figure 1:
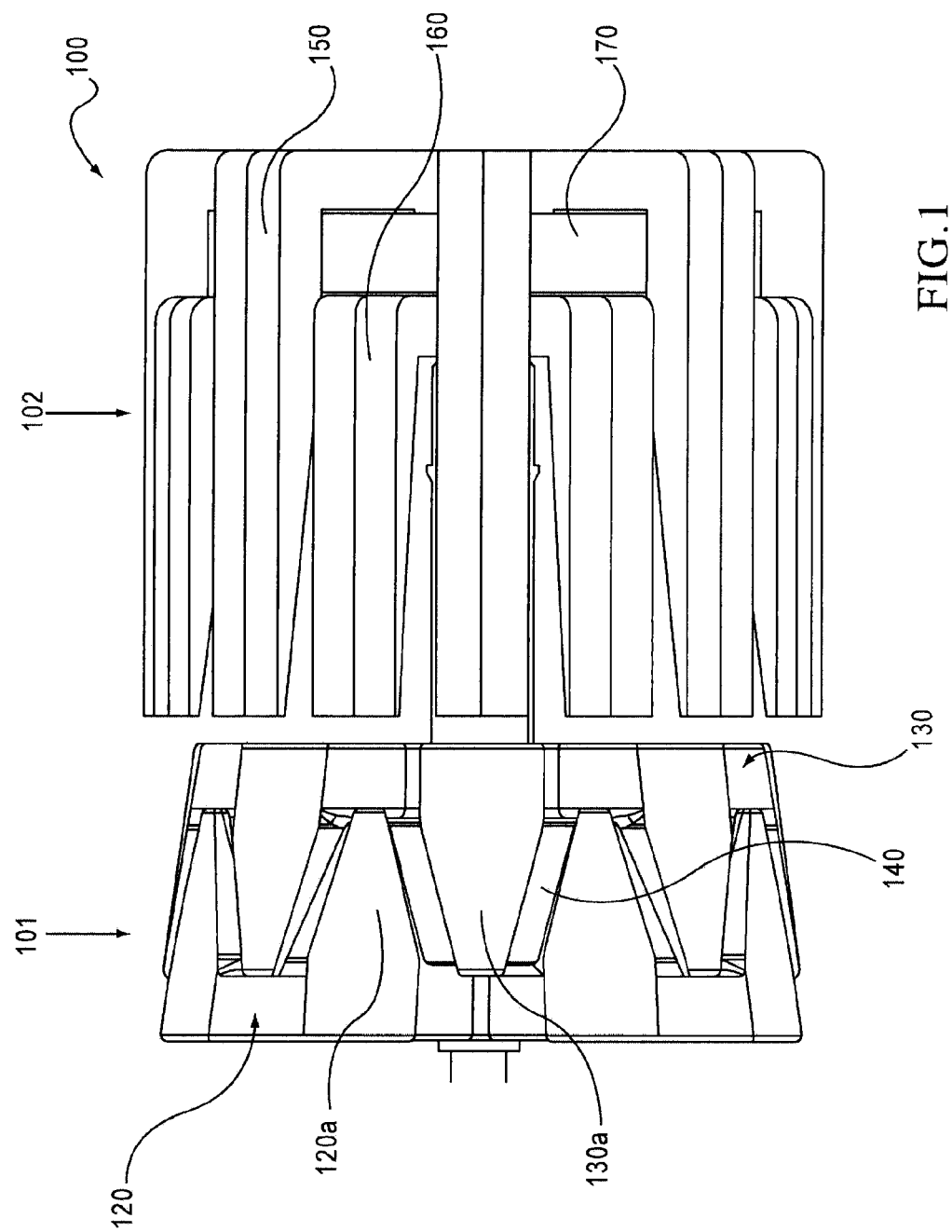
FIG. 1 shows the internal components for a first exemplary electrical output device or electrically driven device in a partially disassembled view, in accordance with aspects of the present invention.

FIG. 1 shows the internal components 100 for a first exemplary single phase alternator (or, for example, a generator or other electrical output device; herein referred to throughout, interchangeably and collectively, as a "device," "alternator," or "electric motor") in a partially disassembled view, in accordance with aspects of the present invention. Such a device is usable in many driven rotation applications to produce electrical output, such as for use with an automobile engine.

As shown in FIG. 1, in this first exemplary variation, a first, rotating portion 101 of the internal components 100 is similar in design and operation to a conventional Lundell rotor or Claw Pole rotor, used, for example, in many conventional automobile alternators.

The rotating portion 101 includes first magnetic polar portions (e.g., north magnetic poles) 120 and a second magnetic polar portions (e.g., south magnetic poles) 130. The first and second magnetic polar portions 120, 130 encompass an internal coil portion 140, such as a coiled wire. The internal coil portion 140 receives an energizing current (e.g., a fixed current, such as a direct current or DC). As a result of the energizing current in the coil portion 140, a flux is produced through the center of the coil portion 140 and about the outside of the coil portion 140 (in a path B, as best shown in the cross-sectional view of FIG. 2), or a flux is otherwise produced, such as through the use or motion of permanent magnets (not shown in this exemplary variation). Each of the first and second magnetic polar portions 120, 130 includes a plurality of poles 120a, 130a, respectively, such that a multiple pole rotor (e.g., 18 alternating polarity poles 120a, 130a) is created by the combination of the first and second magnetic polar portions 120, 130.

By using such magnetic poles 120a, 130a, this approach produces an alternating flux when moving past a flux conducting material completing a flux path, analogous to how poles on moving magnets are able to produce an alternating flux in coils when the magnets are moved proximate to such coils in a suitable orientation and direction (e.g., when the magnets move rotationally next to one or more coils having axes perpendicular and circumferential to the axis of the rotating magnets, as is common with some conventional generators or alternators). However, among other advantages, the approach shown in FIG. 1 may simplify manufacturing over a multiple wound approach, since many small diameter coils are not required.

Figure 2:
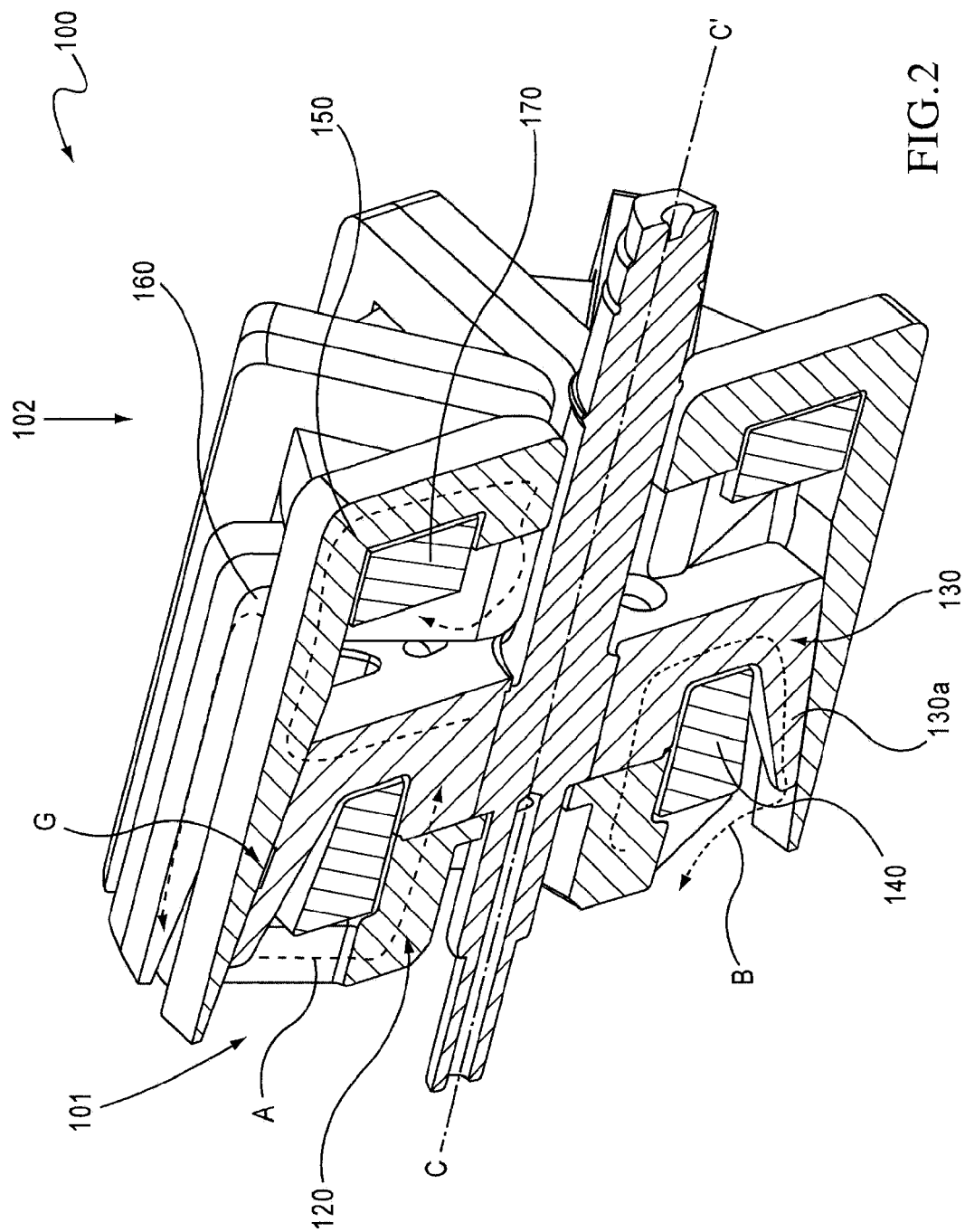
FIG. 2 is partial cross-sectional assembled view of the exemplary device of FIG. 1.

As further shown in FIG. 1 and in the partial cross-sectional assembled view of FIG. 2, in this first exemplary variation, a second, stationary portion 102 of the internal components of the device 100 includes a first laminated steel or other flux conducting material portion 150 and an output coil 170. As shown in FIG. 2, upon assembly, such that the rotating portion 101 nestably rotates within the stationary portion 102, in a first rotated position (as shown in FIG. 2) of the rotating portion 101 relative to the stationary portion 102, each first flux conducting portion 150 aligns with a second magnetic polar portion 130. The first flux conducting portion 150 partially wraps around a first portion of the output coil 170 to form a portion of flux path A, having flux, for example, in the direction of the arrowheads, that continues from the aligned second magnetic polar portion 130. A second flux conducting portion 160 continues the flux path A through the center of the output coil 170 and about the nested rotating portion 101. In the position of the rotating portion 101 shown in FIG. 2, the flux path A then continues from the second flux conducting portion 160, which is aligned with the first magnetic polar portion 120, into the first magnetic polar portion 120, about the internal coil portion 140 and into the second magnetic polar portion 130, such that a completed flux path A is formed.

Figure 3A:
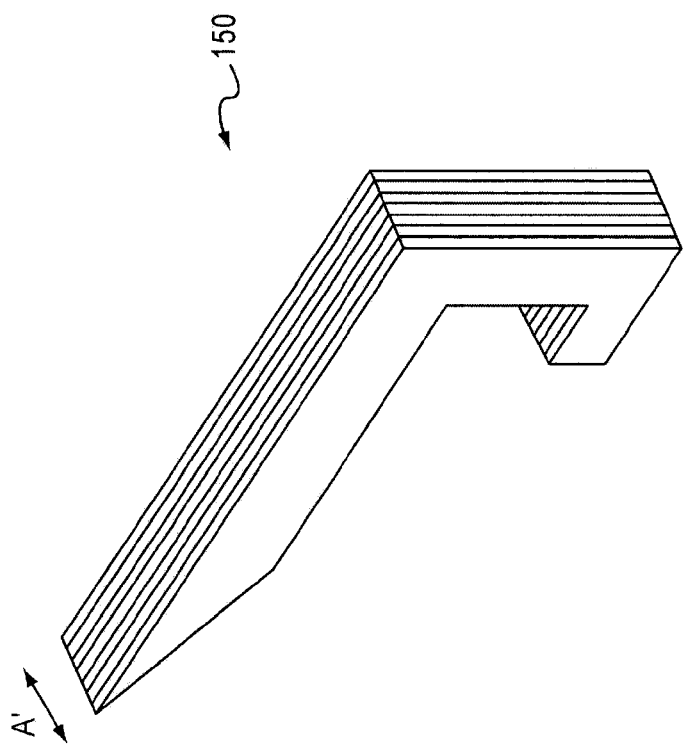
FIG. 3A is a representative view of an exemplary laminated construction flux conducting material component, usable in accordance with aspects of the present invention.

The side by side ("SBS")-shaped configuration (as opposed to the typical "nested" configuration of a typical related art automotive alternator, for example) shown in FIG. 1 (and also FIG. 2) presents one approach to enhancing three dimensional flux paths by locating laminated flux conducting material portions proximate to the magnetic polar portions 120, 130 in an "end-to-end" configuration. For example, as shown in FIGS. 1 and 2, the flux conducting portions 150, 160, may comprise laminated steel, such that abutted flat steel laminate portions make up each flux conducting portion 150, 160, with the direction of the flat steel laminate portions laminated lengthwise in the direction of the flow path A. FIG. 3A shows an exemplary representative view of the flux conducting material portion 150, comprising laminated steel portions, in accordance with aspects of the present invention. The approach of using laminations allows an essentially two dimensional flux conducting material (each laminate portion) to produce a three dimensional flow of flux (e.g., in path A shown in FIG. 2). Among other things, this approach may minimize eddy current and/or other flux losses relating to flux travel in direction A. Another exemplary approach, as discussed further below, also or alternatively includes use of tape-like wound coil features, such as those shown in FIGS. 4A-4C, within certain portions of the device. Alternatively to the use of such laminated or tape-like wound coil features, powdered metal, amorphous metal or metallic glass or shaped laminations may be used for such portions. One potential drawback of use of such powdered metal or shaped laminations is typically increased cost.

In operation, as shown in FIGS. 1 and 2, as the rotating portion 101 rotates, each second flux conducing portion 160 eventually aligns with a second magnetic polar portion 130, and, due to the opposite polarity of the second magnetic polar portion 130 to the first magnetic polar portion 120, the direction of the flux path reverses.

The rotation of the rotating portion 101 and the travel of the flux about the flux paths formed by the aligning portions of the rotating portion 101 and the stationary portion 102 produces a varying flux through the output coil portion 170, such that a varying output is produced from the coil portion 170 (when operated, for example, as an electrical output generating device). This output may be, for example, generally sinusoidal in character. The output may be produced, for example, though wire leads connected to the coil portion 170 to provide an alternating current (AC) output for use in a selected application, such as to assist in operating an automobile engine and/or charge a battery (e.g., by rectifying the AC output into DC current). Similarly, the device 100 may be operated as an electrically driven device by alternatingly energizing the coil portion 170, producing a resulting rotation in the rotor portion 101.

Further, adjustment of the power output of the device 100 when operated as an alternator, for example, or the power input/output for operation of the device 100 as a motor may be obtained by altering the relative positions of the rotor portion 101 and the stator portion 102. For example, the size of the air gap G (FIG. 2) between the rotor portion 101 and the stator portion 102 may be increased or decreased by moving the rotor portion 101 relative to the stator portion 102 in the direction C-C'. Note that the surfaces of the magnetic polar portions 130, 120, and the surfaces of the flux conducting portions 150, 160, about the air gap G can make an oblique angle with respect to the axis of rotation C-C', as shown in FIG. 2. Using such an oblique angle for the surfaces of these components in the design of the device 102 improves the surface area of proximity for flux communication between the conducting portions 150, 160 and the magnetic polar portions 130, 120 and may increase operating efficiency.

An advantage of the approach of this variation of the present invention over some devices of the related art is that to, for example, double the pole count of the device, the poles can simply be reduced in size and doubled in number, without more complex and smaller turn diameter winding changes having to be made (e.g., not having to thread such windings about each pole), with the issue of copper or other conductor diameter of the windings thereby potentially becoming a limiting factor, due to physical constraints of some related art designs. Among other things, the lack of having to address changing conductor diameter also reduces the corresponding change in resistance that must be dealt with when changing conductor diameters are involved in a design change.

Further, the normal field losses of the variation of the present invention shown in FIGS. 1 and 2 does not vary significantly from field losses for conventional alternators and electric motors. Thus, since resistance losses tend to dominate with respect to efficiency in conventional alternators and electric motors, particular implementations of this implementation of the present invention may allow much greater variation in size and characteristics of device output, without the increased losses that result with conventional alternators and electric motors.

The flux conducting material portions 150, 160 of this variation of the present invention can be made of a number of materials. For example, in some variations, these portions 150, 160 comprise powdered or amorphous metal materials. In other variations, these portions 150, 160 comprise laminations that are joined to form each portion. Among other things, the use of such joined lamination portions overcomes difficulties in meeting the geometrical needs and limitations of materials (e.g., direction of flux relative to steel geometry, so as to minimize generation of eddy currents and other losses that can occur in connection with use of powdered metal materials) and overcoming limitations with typical availability of lamination materials of needed sizes and shapes. The lamination materials can comprise, for example, steel.

Figure 3B:
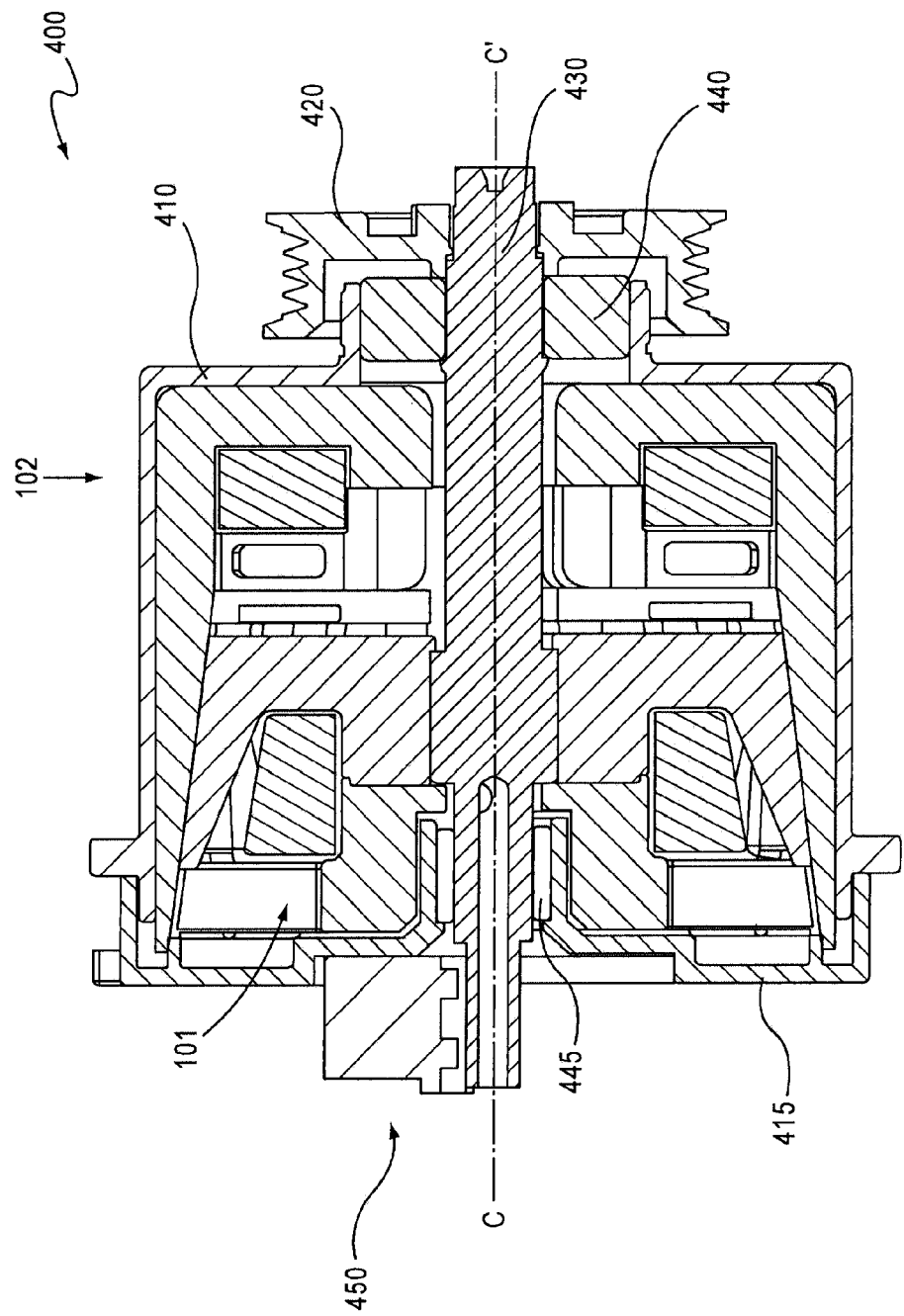
FIG. 3B is a cross-sectional view of an assembled exemplary electrical output device or electrically driven device having the internal components shown in FIGS. 1-2 and additional external and other components, in accordance with aspects of the present invention.

FIG. 3B is a cross-sectional view of an assembled exemplary device 400 having the internal components shown in FIGS. 1 and 2 and external and other components. As shown in the view of FIG. 3B, the fully assembled device 400 includes one or more housing portions 410, 415; an input rotational power pulley 420 for producing rotation of the rotating portion 101, in turn attached to a shaft 430 (the rotational power to rotate the input pulley 420 can be provided, for example, by a combustion engine having an output pulley operatively coupled, such as via a belt, to the input pulley 420); one or more friction reducing portions 440, 445, such as bearings and/or bushings, for rotationally slidably allowing the shaft 430 to rotate within the housing portions 410, 415; and fan components and/or other features, such as a brush assembly 450. Note that, in the variation of the present invention shown in FIG. 3B, the friction reducing portion 440 (e.g., bearing) is contained within a convex portion of the pulley 420, thereby reducing the overall size of the device 400 compared to a device using a pulley not so encompassing the friction reducing portion.

Alternative to the arrangement shown in FIG. 3B, the rotor and stator portions 101, 102 may be reversed, and the pulley 420 and/or other features attached to the shaft 430, as shown to the right in FIG. 3B, may be included on the shaft 430 to the left of the rotor and stator portions 101, 102, as shown in FIG. 3B. In this arrangement, the shaft 430 thereby does not need to extend fully through the device 430, thereby reducing overall device size and enabling additional room for use for components internal to the device 400.

In some variations of the device 400 of FIGS. 1-3B, the first and second magnetic polar portions 120, 130 of the first, rotating portion 101 comprise cast iron or steel, and are unlaminated. (Laminated material may also be used, for example, if a fixed frequency output is required, but for such application, the device may be poly phase and inverted.) Because there is no change in flux in this portion of the device 400, little or no eddy current or other similar current drains are typically generated, and therefore the use of lamination or other features to reduce these drains may not improve operation when used in these areas.

Among other advantages, the exemplary device 400 shown in FIGS. 1-3B allows the poles of the device 400 to be placed as far towards the outer edges of the device 400 as possible (among other things, thereby maximizing the size of the pole portions and maximizing the number that may be used for a given device size), while allowing the electrical coils 140, 170 to be placed as close as possible to the centerline (e.g., shaft 430) of the device 400, thereby minimizing the size, wire length, and weight of the windings used for a given device size; minimized winding size also minimizes the overall diameter of the device 400, to the extent this feature is important to a particular application. Further, among other things, increased numbers of poles allows higher frequency in device operation, with the maximum separation between poles, thereby minimizing flux leakage.

In addition, with the device 400 of FIGS. 1-3B, the coils 140, 170 used are relatively short in length of winding compared to coils of related art motors and alternators, and have low resistance. As coils in the related art are often a primary source of heat, the heat generated by the device of FIGS. 1-3B is generally much less than the heat generated by typical related art motors and alternators.

Tape-Like Wound Torroidal and Other Device Portions

In some variations of electrical output generating devices and/or electrically driven devices in accordance with aspects of the present invention, flux conducting materials are also used inside the coil portions 140, 170, such as within the coil portions and between the flux conducting material portions 150, 160, as shown in FIGS. 1 and 2. One problem with the geometry of using the flux conducting materials within the coil portions 140, 170 shown in the arrangement of FIGS. 1 and 2, and in other locations having similar physical size limitations, is that the thickness of, for example, steel laminate layers may be constrained to be generally pie-shaped and to narrow significantly near the center of the coil portions 140, 170.

In some variations of electrical output generating devices and/or electrically driven devices in accordance with aspects of the present invention, the problem with physical size limitations, such as occurs within coil portions, may be addressed by using torroidal shaped flux conducting portions comprised of tape-like wound laminations. With these variations, the flux conducting material portions 150, 160 abut the torroidal shaped portion within the coil portions 140, 170.

Figure 4A:
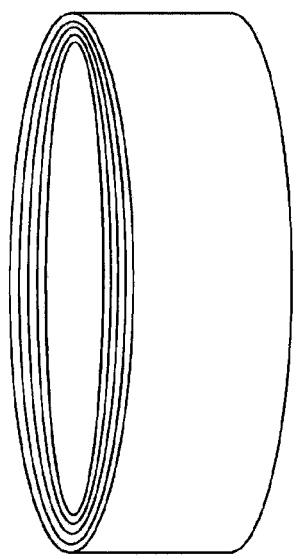
FIGS. 4A, 4B and 4C present representative views of a tape-like wound torroidal flux conducting component, in accordance with aspects of the present invention.
Figure 4B:
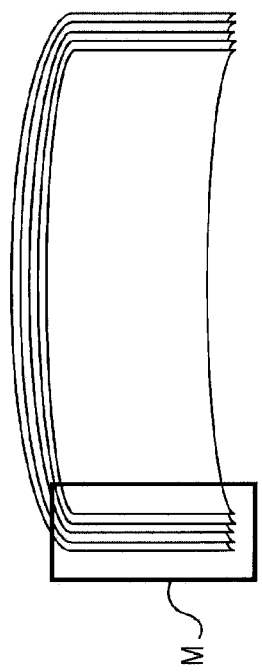
Figure 4C:
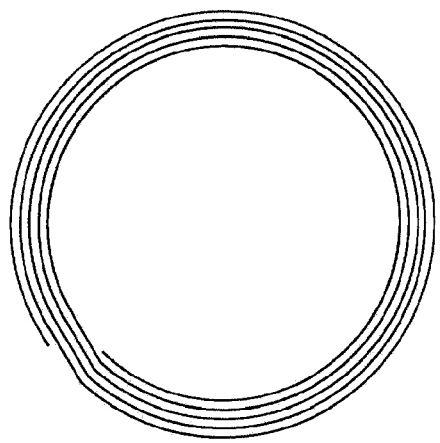

In some variations, the shape of this portion of the flux conducting material has a generally square or rectangular cross-sectional shape. The torroid is constructed of flux conducting material in a tape-like form. FIGS. 4A-4C present representative views of the flux conducting torroidal shape, in accordance with this variation. FIGS. 4A and 4B show a representative perspective drawing and a partial cutaway drawing, respectively, of an exemplary square or rectangular cross-sectionally shaped (see, e.g., area M of FIG. 4B) torroidal flux conductor. FIG. 4C is a representative drawing of the winding used to create the torroidal flux conductor of FIG. 1 from a side view, showing the "tape-like" wind features.

A similar result for this portion of the device (e.g., minimizing eddy current related and/or other losses) can be achieved using powdered iron; however, powdered iron generally does not conduct magnetic flux as efficiently as, for example, steel laminate and does not include the physical layer features perpendicular to the direction of flow, further minimizing eddy current related and/or other losses. In addition, the use of powdered iron has the further drawback of increased hysteresis losses.

Similar to the use of the tape-like wound torroid for the flux conducting material portions, a tape-like wound torroid may be used to form the coil portions of the device (e.g., coil portions 140, 170 shown in FIGS. 1-3B). Among other things, the use of a tape-like torroid for the coil reduces resistance and allows higher packing density over circularly cross-sectionally shaped wire, due, for example, to the coil's square or rectangular cross-sectional shape.

Alternator with Reduced Flux Leakage

One often important factor in device performance for electrical output generating devices and/or electrically driven devices in accordance with aspects of the present invention is the amount of flux leakage that occurs. The practical effect of flux leakage is that current becomes limited; the device therefore has the appearance of operating "reactively," to limit power density. In the device 400 of the exemplary variation shown in FIGS. 1-3B, the closeness in proximity and lengthwise overlap of the adjacent rotor poles (e.g., 120a, 130a), in the direction parallel to the axis of rotation C-C', as well as the closeness in proximity and lengthwise overlap of adjacent flux conducting material stator portions 150, 160 relative to one another and relative to the rotor poles (e.g., 120a, 130a), also in the direction parallel to the axis of rotation C-C', can result in some "leakage" of flux between the poles and into the proximate flux conducting material portions at whatever point in rotation the rotating portion 101 is located at a particular moment in operation. For example, in the position shown in FIG. 2, since the direction of flux flow along path A in the first flux conducting material portion 150 is opposite the direction of the flux flow along path A in the second flux conducting material portion 160 and in the general flow direction from the second pole 130a toward the first pole 120a, flux may "leak" from the first flux conducting material portion 150 directly to the first pole 120a, rather than following flow path A, due, among other things, to the close proximity of these portions along their lengths in the direction C-C'.

Among other things, in order to reduce this reactive, flux leakage effect, the device of a second exemplary variation of the present invention, as shown in FIGS. 5-8 includes features in the rotating and fixed portions of the flux conducting material so as to reduce flux leakage by further physically isolating from one another portions of the flux conductive path that cause magnetic flux to flow in opposite, or different, directions.

Figure 5:
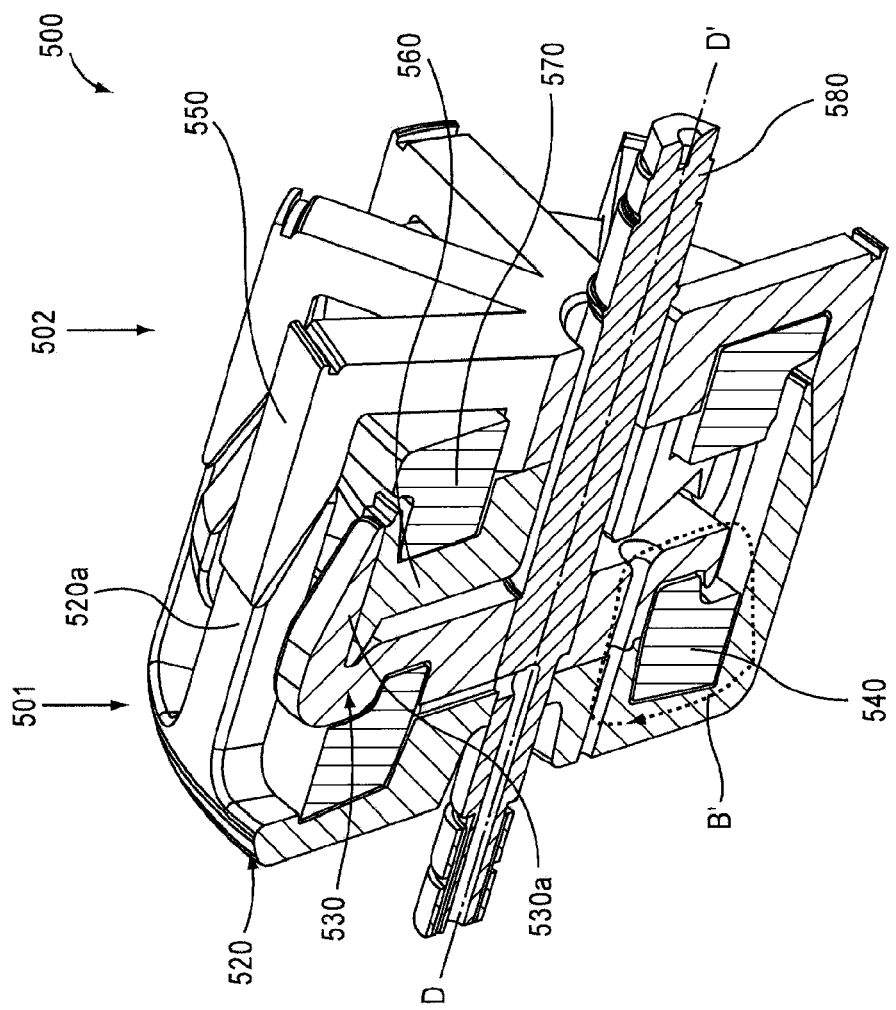
FIG. 5 shows the internal components of a second exemplary electrical output device or electrically driven device in an assembled view, in accordance with aspects of the present invention.

FIG. 5 shows the internal components 500 for a second exemplary device in an assembled view, in accordance with aspects of the present invention. Such a device is likewise usable in many driven rotation applications to produce electrical output, such as for use with an automobile engine.

As shown in FIG. 5, in this second exemplary variation, a first, rotating portion 501 and a second, stationary portion 502 of the internal components 500 of the device are in some ways similar in design and operation to those of the variation of FIGS. 1-3B and are usable, for example, in many typical automobile alternator and/or electric motor applications, among others. However, unlike the variation of FIGS. 1-3B, in the variation of FIGS. 5-8, the rotating portion 501 does not nestably rotate within the stationary portion 502.

As shown in FIG. 5, the rotating portion 501 includes first magnetic polar portions (e.g., north magnetic poles) 520 and second magnetic pole portions (e.g., south magnetic poles) 530. The first and second magnetic polar portions 520, 530 encompass an internal coil portion 540, such as a coiled wire. The internal coil portion 540 receives an energizing current (e.g., a fixed current, such as a DC current). As a result of the energizing current in the coil portion 540, a flux is produced through the center of the coil portion 540 and about the outside of the coil portion, or a flux is otherwise produced, such as through the use or motion of permanent magnets (not shown in this exemplary variation). Each of the first and second magnetic polar portions 520, 530 includes a plurality of poles 520a, 530a, respectively, such that a multiple pole rotor (e.g., 18 alternating polarity poles 520a, 530a) is created by the combination of the first and second magnetic polar portions 520, 530. By using such magnetic poles 520a, 530a, this approach produces an alternating flux when moving past a point (e.g., when operated as an electrical output device). However, like the variation of FIGS. 1-3B, among other advantages, the approach shown in FIGS. 5-8 simplifies manufacturing over a multiple wound coil approach, since, among other things, many small diameter coils in close proximity to one another are not required.

As further shown in FIGS. 5-8, in this exemplary variation, the second, stationary portion 502 of the internal components 500 of the device 800 includes a first laminated steel or other flux conducting material portion 550 and an output coil 570. As shown, for example, in FIGS. 5 and 6, in a first rotated position of the rotating portion 501 relative to the stationary portion 502, the first flux conducting portion 550 aligns with a corresponding pole 520a of the first magnetic polar portion 520. As shown in the partial cutaway view of FIG. 6, the first flux conducting portion 550 partially wraps around a first portion of the output coil 570 to form a portion of flux path A', having flux, for example, in the direction of the arrowheads, that continues from the aligned first magnetic polar portion 520. A second flux conducting portion 560 continues the flux path A' through the center of the output coil 570. In the position of the rotating portion 501 shown in FIG. 6, the flux path A' then continues from the second flux conducting portion 560, which is aligned with the second magnetic polar portion 530, into the first magnetic polar portion 520, the first and second magnetic polar portions 520, 530 partially encircling the internal coil portion 540, and the first magnetic polar portion 520 continuing the flux path A' back into the first flux conducting portion 550, such that a completed flux path A' is formed.

Figure 6:
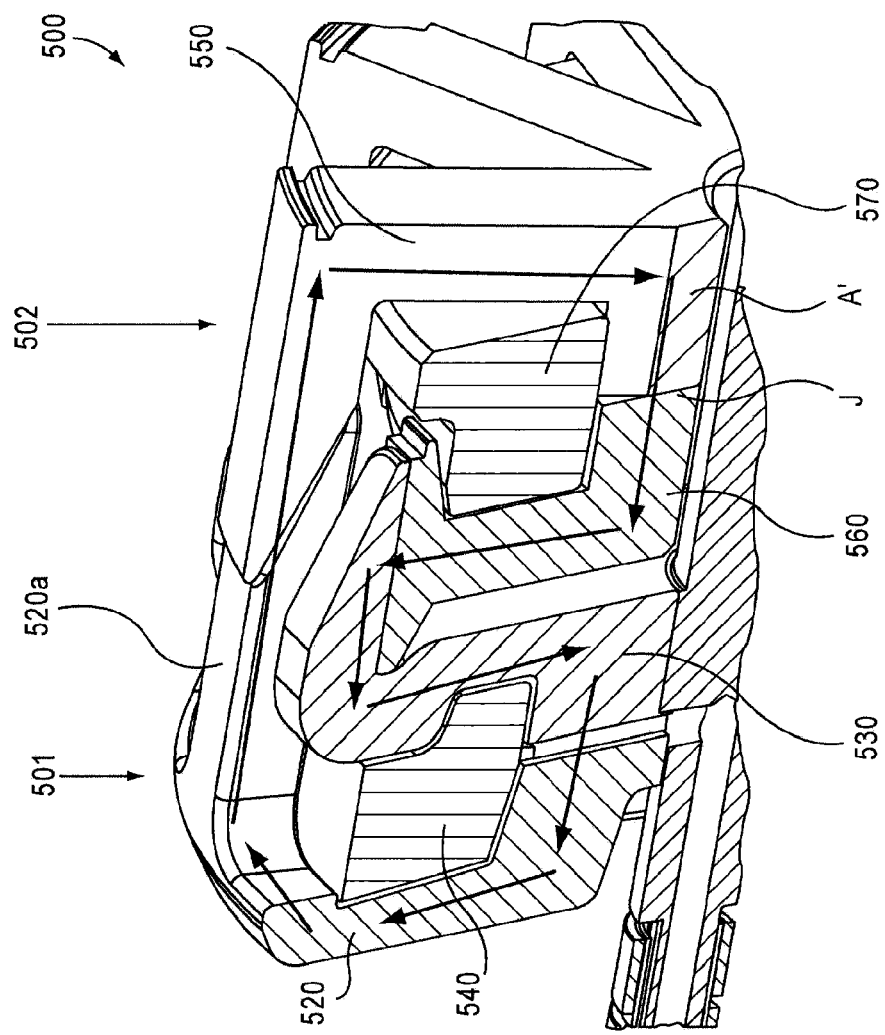
FIG. 6 is a partial cutaway view of the exemplary electrical output device or electrically driven device of FIG. 5.
Figure 7:
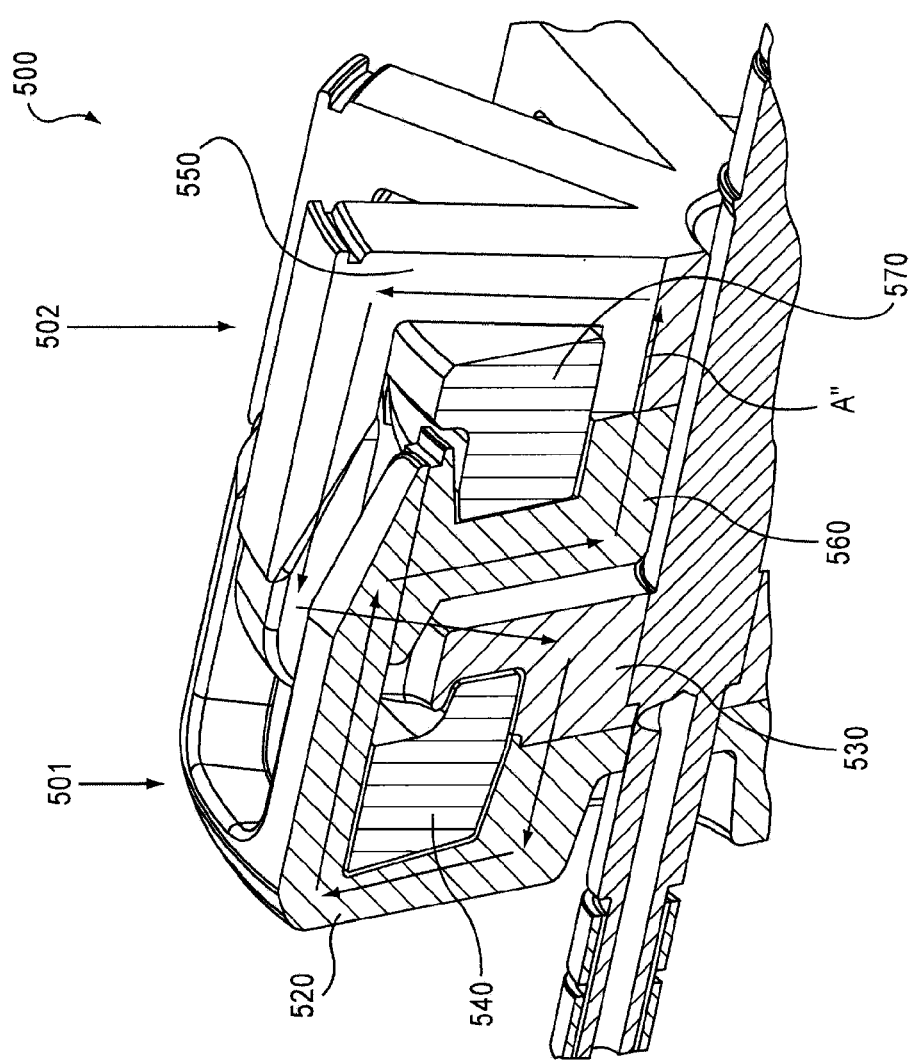
FIG. 7 is a partial cutaway view of the exemplary electrical output device or electrically driven device of FIG. 5, rotated relative to the view of FIG. 6.

In further operation, as shown in FIG. 7, as the rotating portion 501 rotates, the first flux conducing portion 550 eventually aligns with the second magnetic polar portion 530, and, due to the opposite polarity of the second magnetic polar portion 530 to the first magnetic polar portion 520, the direction of the flux path A" reverses, as shown by the arrowheads, relative to the direction of the flux path A' shown in FIG. 6.

The rotation of the rotating portion 501 and the travel of the flux about the flux paths A', A" formed by the aligning portions of the rotating portion 501 and the stationary portion 502 produces a varying flux through the output coil portion 570, such that a varying output is produced from the coil portion 570. This output, when the device is operated, for example, as an electrical output device, may be generally sinusoidal or otherwise alternating in character. The output may be produced, for example, though wire leads connected to the coil portion 570 to provide an alternating current (AC) output for use in a selected application, such as to assist in operating an automobile engine and/or charge a battery (e.g., by rectifying the AC output into DC current).

In addition to the advantages that may result from implementing the principles of the variation of FIGS. 1-3B, implementing the principles of the variation of the present invention shown in FIGS. 5-8 may include the advantage of minimizing flux leakage between the adjacent magnetic polar portions 520, 530 and flux conducting material portions 550, 560. This result is due at least in part to the reduced length of closely proximate overlapping adjacent magnetic polar portions 520, 530 and flux conducting material portions 550, 560 generally in a direction parallel to the direction D-D' of the axis of the shaft 580 of the device 500. For example, as shown in FIG. 6, in contrast to the variation of FIGS. 1-3B, flux through the first flux conducting material portion 550 does not travel along an adjacent path to flux through the second flux conducting material portion 560. In addition, neither the first flux conducting material portion 550 nor the second flux conducting material portion 560 is aligned with and overlapping along its length with either the first magnetic polar portion 520 or the second magnetic polar portion 530.

Figure 8:
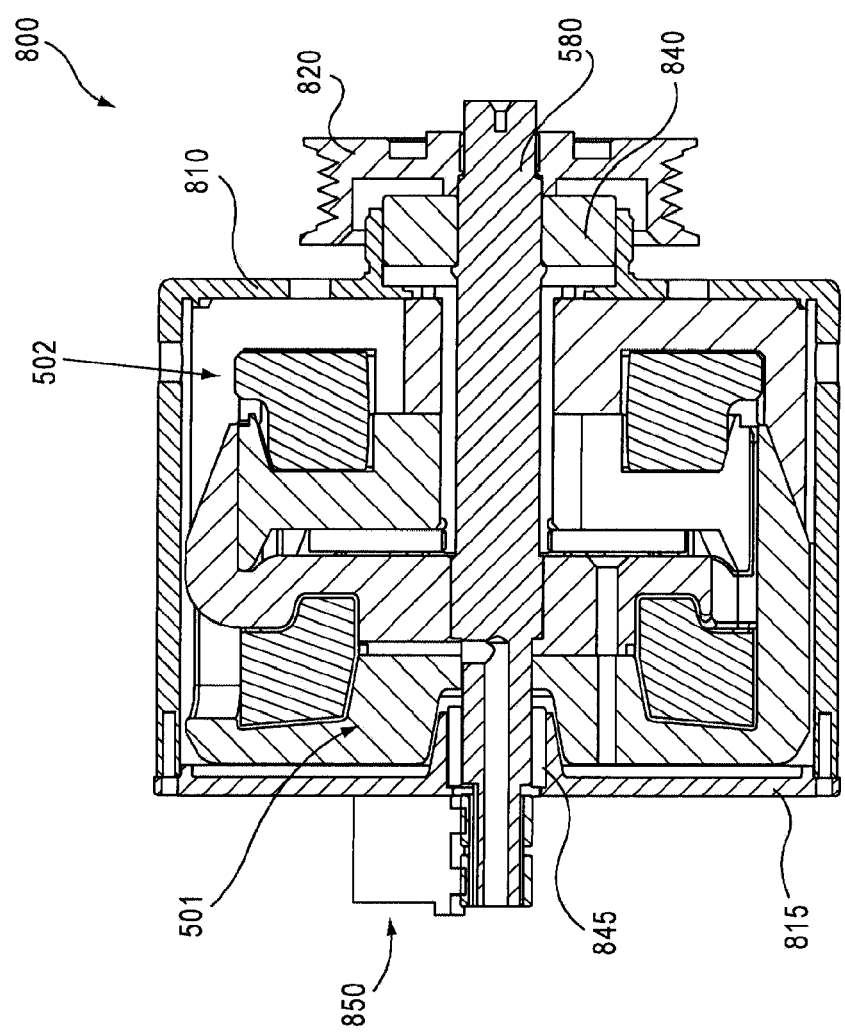
FIG. 8 is a cross-sectional view of an assembled exemplary electrical output device or electrically driven device having the internal components shown in FIGS. 5-7 and external and other components, in accordance with aspects of the present invention.

FIG. 8 is a cross-sectional view of an assembled exemplary device 800 having the internal components shown in FIGS. 5-7 and external and other components. As shown in the view of FIG. 8, the fully assembled device 800 includes one or more housing portions 810, 815; an input rotational power pulley 820 for producing rotation of the rotating portion 501, in turn attached to a shaft 580 (the rotational power to rotate the input pulley 820 can be provided, for example, by a combustion engine having an output pulley operatively coupled, such as via a belt, to the input pulley 820); one or more friction reducing portions 840, 845, such as bearings and/or bushings, for rotationally slidably allowing the shaft 580 to rotate within the housing portions 810, 815; and fan components and/or other features, such as brush related portions and features 850.

Similar materials and methods of construction to the materials and methods shown and described in conjunction with the device 400 of FIGS. 1-3B may be used in the construction of the device 800 of FIGS. 5-8. Also similar to the variation of FIGS. 4A-4C, in some variations of this variation of the present invention, square cross-section torroidal shaped flux conducting portions comprised of tape-like wound laminations may be used within the interior of the coil portions of the device to minimize eddy current related and/or other losses, and yet allow three dimensional flux flow. FIGS. 4A-4C illustrate representative views of a torroidal shaped flux conducting portion usable with some variations of the electrical output generating devices and/or electrically driven devices, such as those shown and described with reference to FIGS. 5-8. A similar result for this portion of the device (e.g., minimizing eddy current related and/or other losses) can be achieved using powdered iron; however, the use of powdered iron, generally does not conduct magnetic flux as efficiently as, for example, tape-like wound steel or laminate. In addition, the use of powdered iron has the further drawback of increased hysteresis losses, decreased flux density, and lower permeability.

Disk Type with Sandwiched Flux Conducting Features

In particular implementations of the rotor design for the variation of the device shown in FIGS. 1-3B and FIGS. 5-8, some flux leakage may still occur in the rotor (e.g., rotating portion 101 of FIGS. 1-3B and rotating portion 501 of FIGS. 5-8) between the poles, due to the proximity of the polar portions.

Figure 9A:
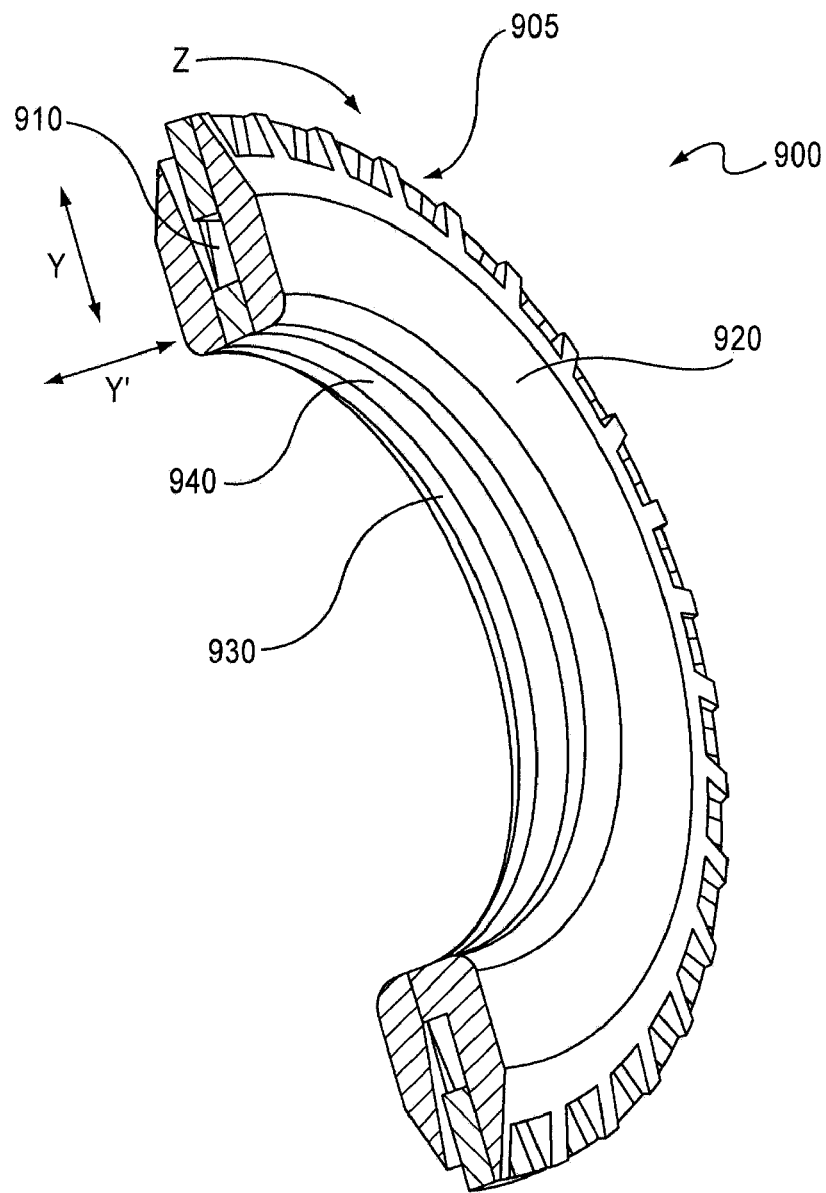

To reduce flux leakage in the rotor and to ease construction, among other things, especially in high pole count rotors, some variations of electrical output generating devices and/or electrically driven devices in accordance with aspects of the present invention may also be implemented using a rotor having poles at an outside edge, in conjunction with a stator sandwichably encompassing the rotor. FIGS. 9A and 9B illustrate views of an exemplary flux concentrating 72 pole rotor device, in accordance with an exemplary variation of the present invention.

Alternatively to the general orientation of the stator and rotor portions so as to have the generally larger cross sectional diameter along the axial direction Y shown in FIGS. 9A and 9B, the device of these figures may be designed such that the stator and rotor portions are oriented with a generally larger cross sectional diameter along the axial direction Y'. Among other things, the orientation in the Y' direction may allow the gap between the stator and rotor to be more easily adjusted, so as to alter power input/output of the device. In addition, the device of FIGS. 9A and 9B may be oriented such that the rotor portion 905 is located in the position of the core portion 940 (and vice versa), and the stator portions 920, 930 may include features such that the flux conductor portions 920a extend in proximity to the rotor portion 905 (e.g., in the direction E' as shown in FIG. 9B).

In FIGS. 9A and 9B, the permanent magnet portions of the poles for the rotor are located so as to minimize flux leakage. For example, as shown in FIG. 9A, the device 900 is a generally disk shaped and has layers that include an alternating magnet and flux concentrator portion at the middle outside edge of a cross-section of a rotor portion 905, an output windings portion 910 at the center of the cross-section of the device 900, stator portions 920, 930, and a torroidal tape-like wrapped core portion 940.

The rotor portion 905 is rotatable relative to the stator flux portions 920, 930, which generally are fixedly located (e.g., by attachment to a housing).

Figure 9C:
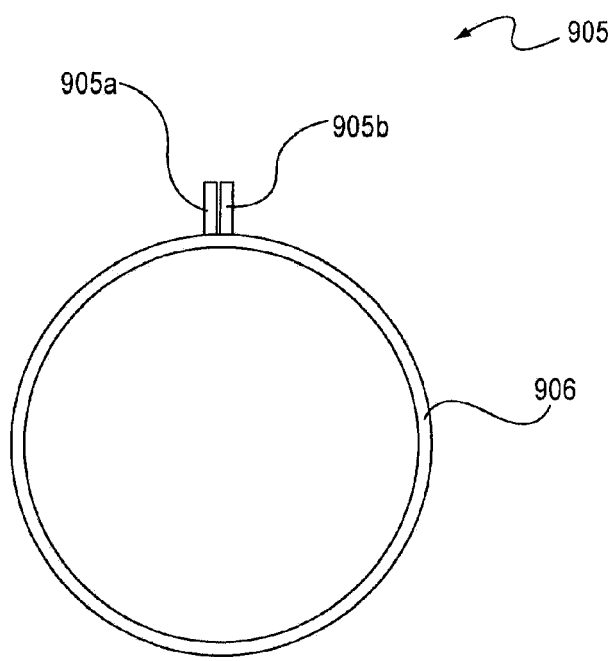
FIG. 9C presents a representative view of an exemplary alternating magnet and flux concentrator portion of an electrical output device or electrically driven device, in the process of construction in accordance with aspects of the present invention.
Figure 9D:
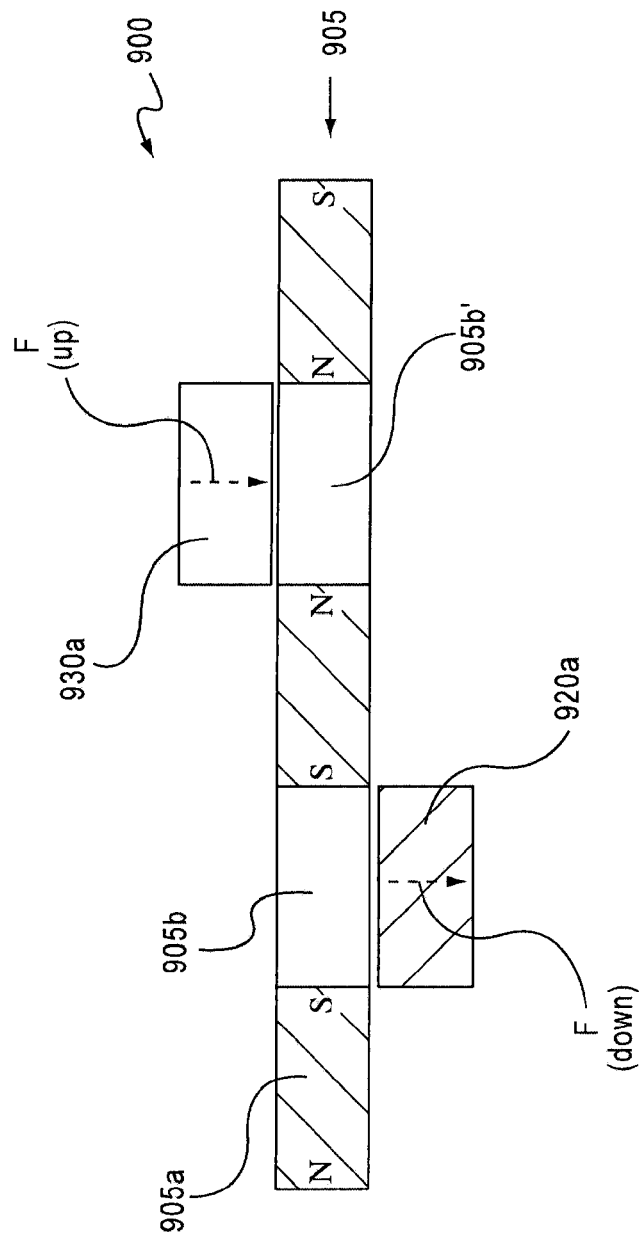
FIG. 9D shows a representative view of the electrical output device or electrically driven device of FIGS. 9A-9B from a view perpendicular to the direction E-E' shown in FIG. 9B.
Figure 9E:
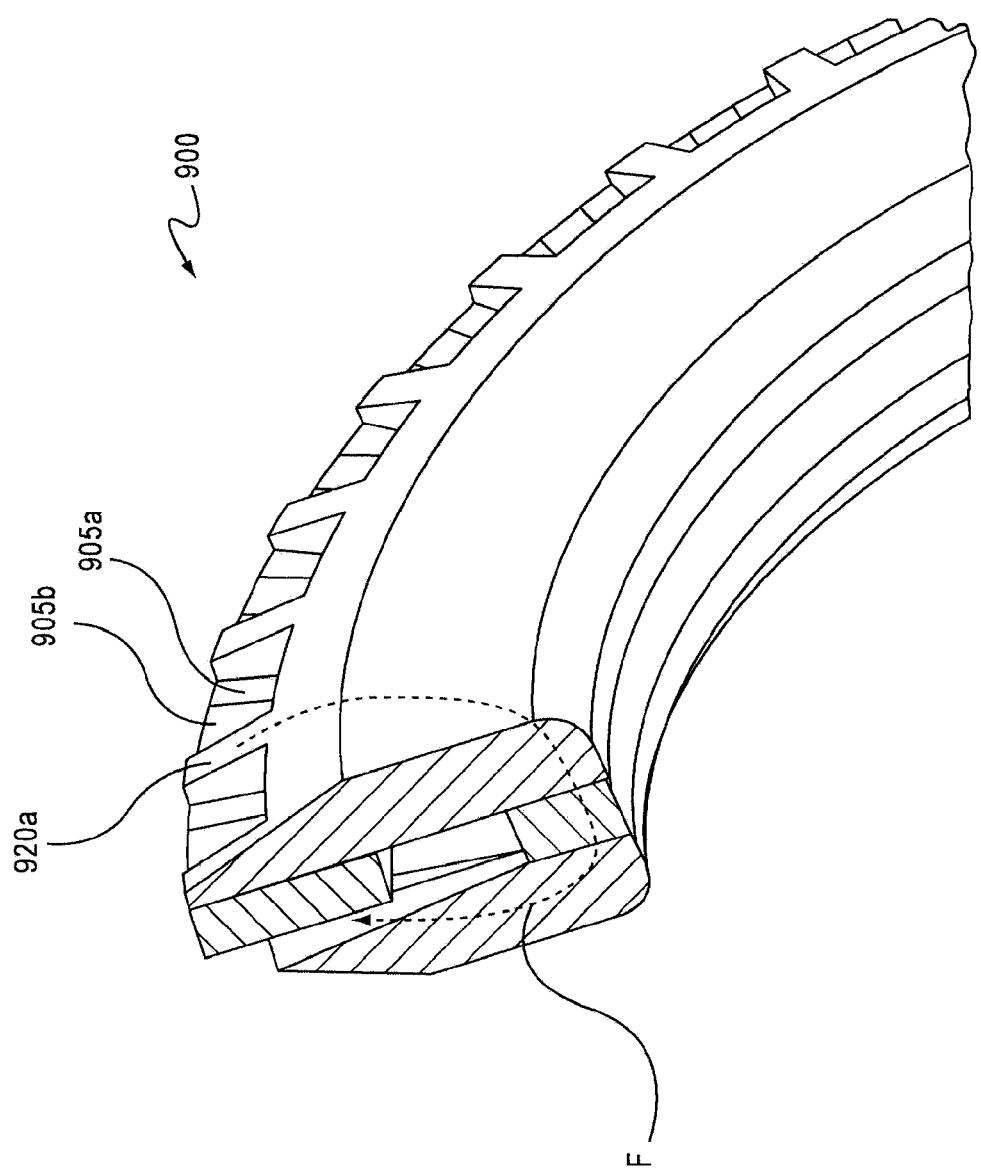
FIG. 9E is a partial cutaway view of the electrical output device or electrically driven device of FIG. 9B.
Figure 9G:
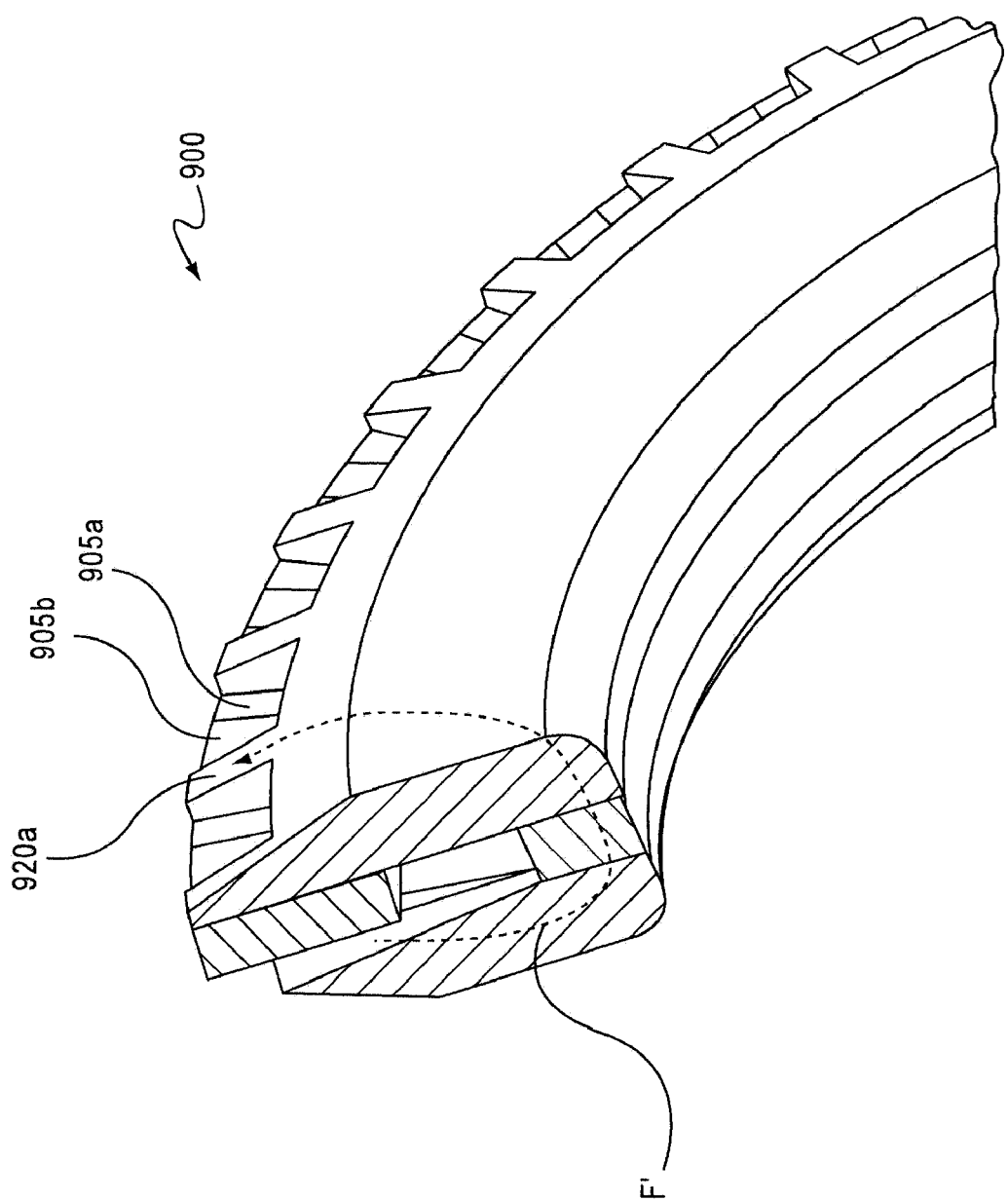
FIG. 9G is a partial cutaway view of the electrical output device or electrically driven device of FIG. 9B, after rotation of the rotor as shown in FIG. 9F.

As further shown in close-up in FIG. 9B, the rotor portion 905 includes alternating magnet portions 905a, such as one pole of a magnet (successive magnet portions having opposite orientations as further shown in FIGS. 9D and 9F), and flux concentrator portions 905b formed of a flux inducing material, such as iron.

In a first exemplary variation, rotor portion 905 may be constructed, for example, by assembling discrete magnet portions with discrete sections of iron or other flux inducing materials, such as by adhering or otherwise attaching the discrete portions and pieces to a ring portion. FIG. 9C presents a representative view of an exemplary rotor portion 905 in the process of construction, in accordance with an exemplary method of constructing an electrical output generating device and/or electrically driven device of the present invention. As shown in FIG. 9C, each magnet portion 905a is adhered to a ring portion 906 and to a flux concentrator portion 905b, such as by gluing, welding, bolting, or otherwise coupling, adhering, or attaching.

In a second exemplary variation, rotor portion 905 is constructed via a method similar to that shown in FIG. 9C, but without use of the ring 906 (e.g., by simply adhering or otherwise attaching each magnet portion 905a to adjacent flux concentrator portions 905b so as to form a ring). In a third exemplary variation, the rotor portion 905 is constructed by inducing magnetic poles onto a magnetizable ring, so as to produce a desired number of alternating poles separated by unmagnetized flux concentrator portions 905b.

In a fourth exemplary variation, the rotor portion 905 is constructed by placing the flux concentrator portions 905b in a mold and then injection molding or otherwise adding the magnet portions 905a between the flux concentrator portions 905b. The magnet portions are magnetized appropriately.

As also further shown in FIG. 9B, the stator portions 920, 930 comprise a material or materials to encourage flux (e.g., steel laminate, powdered or amorphous metal) and include flux extensions (e.g., 920a) alternately alignable with the flux concentrator portions 905b during rotation of the rotor portion 905 relative to the stator flux portions 920, 320. In some variations, the stator portions 920, 930 may also be formed as a single contiguous piece. Generally, flux occurs through each flux extension 920a of a first stator portion 920 when each flux extension 920a is aligned with one of the flux concentrator portions 905b of the rotor 905.

Among other things, the design of the stator portions 920, 930 is such that, in operation, flux on one side (e.g., stator portion 920) is approximately the same throughout that side and opposite in polarity to the flux in the side opposite the rotor 905 (e.g., stator portion 930).

The torroidal tape-like wrapped core portion 940 may be constructed, for example, similarly to that shown in FIGS. 4A-4C.

In operation, in the device of FIGS. 9A-9B, the rotor 905 rotates relative to the stator portions 920, 930. FIGS. 9D-9G show representative views of elements of the rotor 905 and stator portions 920, 930 in operation. FIG. 9D shows a representative view of the device 900 of FIGS. 9A-9B from a view perpendicular to the direction E-E' shown in FIG. 9B. In the representative view of FIG. 9D, a first flux concentrator portion 905b is aligned with and located proximate to a first stator portion extension 920a. As can be seen in FIG. 9B, each of the magnet portions 905a has a first polarity end (N) and a second polarity end (S). Sequential magnet portions 905a are oriented such that each flux concentrator portion 905b, 905b' abuts two magnet portions 905a, which, in turn, are oriented 180° relative to one another, so that each flux concentrator portion 905b, 905b' abuts the same polarity end of the two abutting magnet portions 905a.

With the magnet portions 905a arranged as shown in FIG. 9D, each flux concentrator portion 905b, 905b' is positionable proximate to a maximum area of either N or S pole field, with the field varying minimally within the flux concentrator portion. Among other things, the arrangement of FIG. 9D thereby allows lower grade flux conducting materials (e.g., lower grade steel) to be used, rather than, for example, high flux conducting materials, such as iron. As a result, for example, cost may be reduced.

In the variation of FIGS. 9A-9B, stator portions 920, 930 may be rotatably adjusted relative to each other so as to selectively decrease power and increase speed without increasing voltage, subject to losses and mechanical constraints, for operation as a motor, and to regulate power toward zero, for operation as a generator, or to allow high revolution per minute (RPM) operation as a motor.

For example, in the first position of the rotor 905 relative to the stator extension 920a, 930a, the first flux concentrator portion 905b sandwichably abuts S poles of the two magnet portions 905a. A second flux concentrator portion 905b' sandwichably abutting N poles of two magnet portions 905b is aligned with and located proximate to a second stator extension 930a. As shown in FIG. 9D and the partial cutaway view of FIG. 9E, flux generally travels in the direction F in this position of the rotor 905.

FIG. 9F shows a representative view of the device 900 of FIGS. 9A-9B from a view perpendicular to the direction E-E' shown in FIG. 9B, in a second, rotated rotor position. In the representative view of FIG. 9F, the second flux concentrator portion 905b' is aligned with and located proximate to the first stator portion extension 920b. A third flux concentrator portion 905b" is aligned with and located proximate to a second stator extension 920a. As shown in FIG. 9F and the partial cutaway view of FIG. 9G, flux generally travels in the direction F' in this position of the rotor 905.

Yet another feature of the variation of FIGS. 9A-9G, and as applicable to some other variations of the present invention, is variability in rotational aspects of the output windings portion 910 of the device 900. For example, because the output produced by the output portion 910 of the device 900 is independent of any rotational motion of the output windings portion 910 along the direction of its windings (e.g., in the direction Z shown in FIG. 9A), the output windings portion 910 may selectively be designed to rotate with the rotor portion 905, for example, or to remain stationary with the stator or torroidal portions 920, 930, 940, as convenient, without affecting performance. Thus, for example, output of the output windings portion 910 may selectively be fixably held, so as to produce output (e.g., when the device 900 is operating as an electrical output device) in the same rotational motional frame (e.g., none) of the stator portions 920, 930, or may produce output while rotating in the same rotational frame as the rotor portion 905, without requiring the use of any features (e.g., slip rings) in order to translate the output to the selected rotational motion.

Disk Type with Variable Timing

FIGS. 10 and 11 present another particular implementation of a flux concentrating rotor similar to the variations shown in FIGS. 9A-9G. However, in the variation shown in FIGS. 10 and 11, the stator portions 1010, 1020 of the device 1000 are divided along a frictional plane or other surface 1005, such that the first stator portion 1010 is rotatable relative to the second stator portion 1020. For example, the second stator portion 1020 may be fixably held to a housing, and the first stator portion 1010 may be movable via rotation about a central point G via, for example, a slot in the first stator portion 1010 in which a moveable pin is received (e.g., a servo motor, or a biasing mechanism, such a spring, to which the pin is attached allows the first stator portion 1010 to be selectively rotated relative to the second stator portion 1020).

Operation of the variation of FIGS. 10-11 is similar to that for the variation shown in FIGS. 9A-9G; however, the "timing" of flux transmitted between the first stator portion 1010 and the second stator portion 1020 may be varied relative to one another and relative to the rotor 1030. FIG. 11 shows an end view of the relative positions of the rotor 1030, first stator portion 1010, and second stator portion 1020. FIG. 11 is similar to FIG. 9D; however, compared to the position of the rotor 905 and two stator portions 920, 930 shown in FIG. 9D, the first stator portion 1010 of FIG. 11 has rotated slightly, by a rotational distance H, relative to the second stator portion 1020. (Note that, in one variation, as the first stator portion 1010 and second stator portion 1020 approach alignment relative to one another, flux across the windings portion 1040 approaches zero.)

One result of such change in timing of the two stator portions relative to one another and relative to the rotating rotor is that the amount of flux through the device varies, typically so as to reduce flux. One value of the capability of the device of this variation to so reduce flux is that voltage generated may correspondingly be decreased. In addition, the device may be configured to operate differently at different speeds, for example (e.g., to output the same voltage across a range of speeds when operating as an alternator).

This capability may be useful, for example, in certain applications of an alternator or motor. For example, in an automotive application, it may be desired to regulate the output of the alternator for purposes of operating the automobile electrical components and/or charging the battery. The timing feature of this variation may be used to provide such alternator output regulation.

Similarly, the device of FIGS. 10 and 11 may be configured to operate as a motor, with output of the motor RPM varying as a function of the timing features for a given power and voltage input. Further, the device may be variably operable to function as an alternator or a motor, depending on the voltage input, output, and timing.

Disk Type Device Variations

FIGS. 12-15B present diagrams of portions of another exemplary device, in accordance with aspects of the present invention. The device of FIGS. 12-15B is somewhat similar in overall shape and/or outward appearance to that of FIGS. 9A-11 of Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007. Exemplary aspects of devices having layouts generally as shown in conjunction with FIGS. 12-15B are interchangeably referred to herein as being "disk type."

Figure 12:
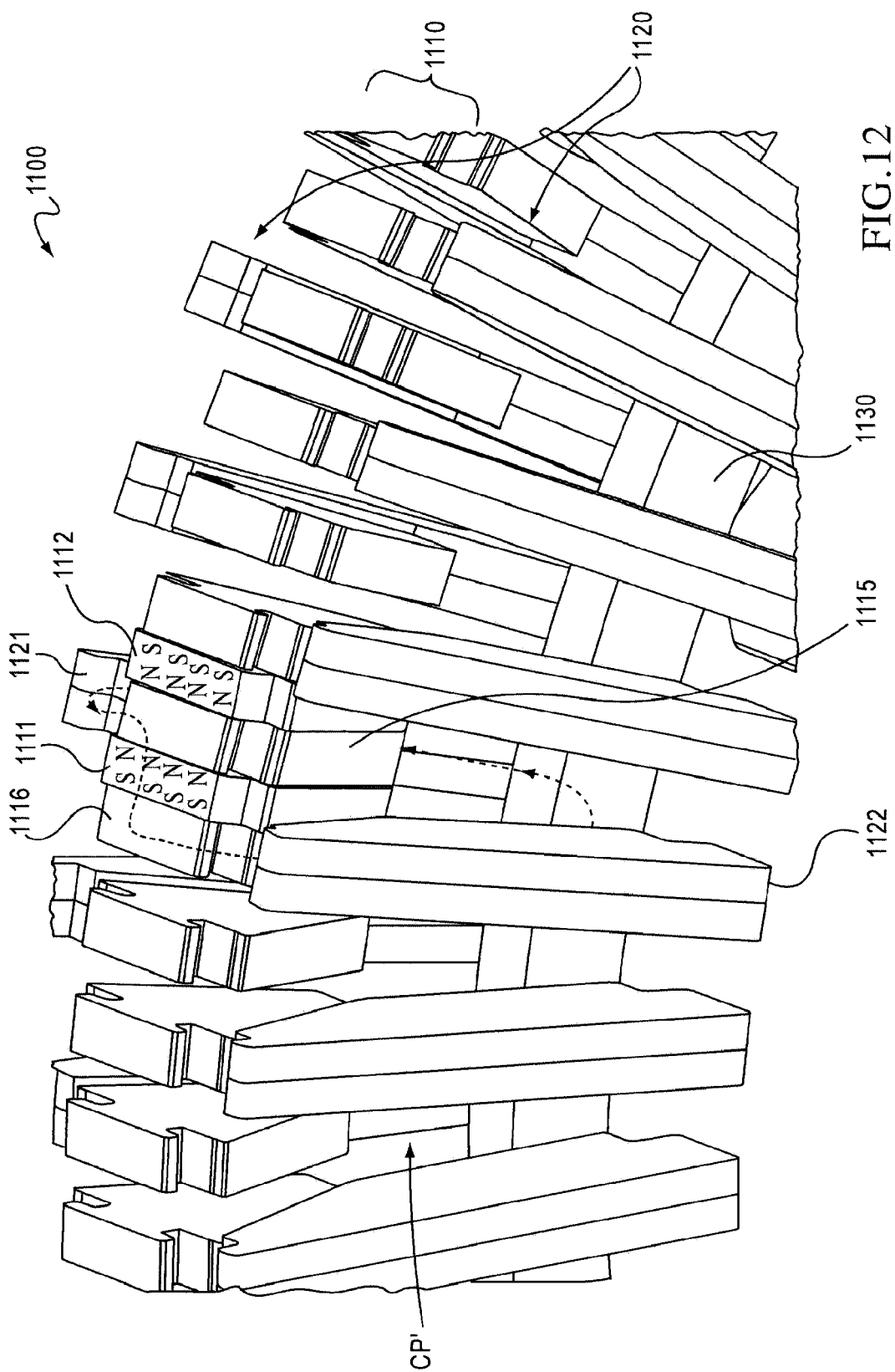
FIGS. 12-15B present diagrams of portions of another exemplary device, in accordance with aspects of the present invention.

FIG. 12 shows a sectional view of a device 1100 having a rotor portion 1110, a stator portion 1120, and a coil portion (for clarity of illustration, the coil is not shown in FIG. 12; see location for coil portion CP' indicated). (Note: although the device portion 1110 is referred to as a rotor portion and the portion 1120 is referred to as a stator portion with respect to FIGS. 12-14 and similarly with respect to FIGS. 15A-15C, the device 1100 may alternatively be constructed or operated such that portion 1110 is fixed so as to serve as the stator portion, with the portion 1120 rotating, so as to serve as the rotor portion; further, the coil may be designed to be fixed to the stator portion or rotated with the rotor portion, depending on the implementation and/or need). As shown in FIG. 12, the rotor portion 1110 includes alternating pairs of magnet portions (e.g., example magnet portions 1111, 1112, only a single pair of which is shown for clarity of illustration) sandwiching flux conducting portion 1115. The magnet portions are oriented such that only edges of a single polarity from both sandwiching magnet portions abut the sandwiched conducting portion (e.g., North polarity "N" for both magnet portions 1111, 1112 abutting sandwiched conducting portion 1115; similarly, only alternating South polarity "S" magnetic portions abut alternating conducting portions, such as conducting portion 1116). The stator portion 1120 includes first stator extensions 1121 and second stator extensions 1122, as well as a core portion 1130.

The magnet portions 1111, 1112 and the conducting portions 1116 of the rotor portion 1110 can have a variety of shapes and orientations for different optimized operating conditions. For example, the magnet portions 1111, 1112 and the conducting portions 1116 of the rotor portion 1110 can have the arrowhead shape illustrated in FIG. 12. This shape is advantageous for minimizing the amount of magnet and concentrator material needed in order to conduct flux from to the stator extensions 1122 and 1121. Minimizing the amount of magnet material and concentrator material saves cost in manufacture and also increases the efficiency of the device. Alternatively, the magnet portions 1111, 1112 and the conducting portions 1116 of the rotor portion 1110 can have one of a number of other shapes including rectilinear, rounded or ring shapes (not shown).

The first stator extensions 1121, second stator extensions 1122, and core portion 1130 of the stator portion 1120 about the entire circumference of the device 1100 form a generally disk or torroidal shaped rotor. The magnet portions 1111, 1112 and flux conducting portions 1115, 1116 of the rotor portion 1110 about the entire circumference of the device 1100 form a generally disk or torroidal shape that nestably fits at the outer periphery of the stator portion 1120.

In operation, the rotor portion 1110 is rotatable relative to the stator portion 1120. When an energizing current (e.g., alternating current, AC) is provided to the coil, at the position shown in FIG. 12, a flux is transmitted through the first stator extension 1121, a first one of the flux conducting portions 1115, the magnet portion 1111, a second one of the flux conducing portions 1116, the second stator extension 1122, and the core 1130. Similarly to other variations of devices described in Applicant's U.S. patent application Ser. No. 12/149,931, now U.S. Pat. No. 7,800,275, titled "ELECTRICAL DEVICES USING ELECTROMAGNETIC ROTORS" filed May 9, 2008, claiming priority to U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, the relative positions of the stator extensions 1121, 1122 may be varied so as to effect proper "timing" for most efficient or other operation of the device. For example, relative position may be varied in order to vary output, such as when power generation is not needed or needs to be reduced.

Figure 13:
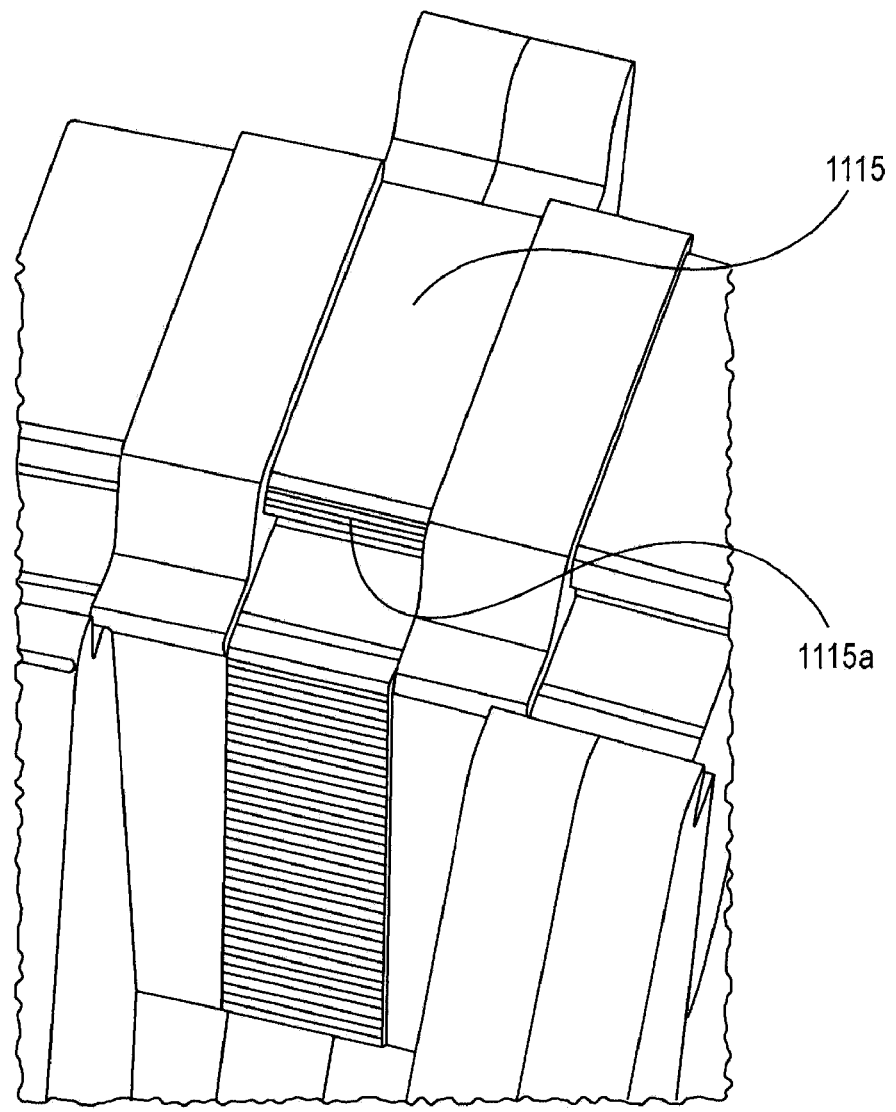
Figure 14:
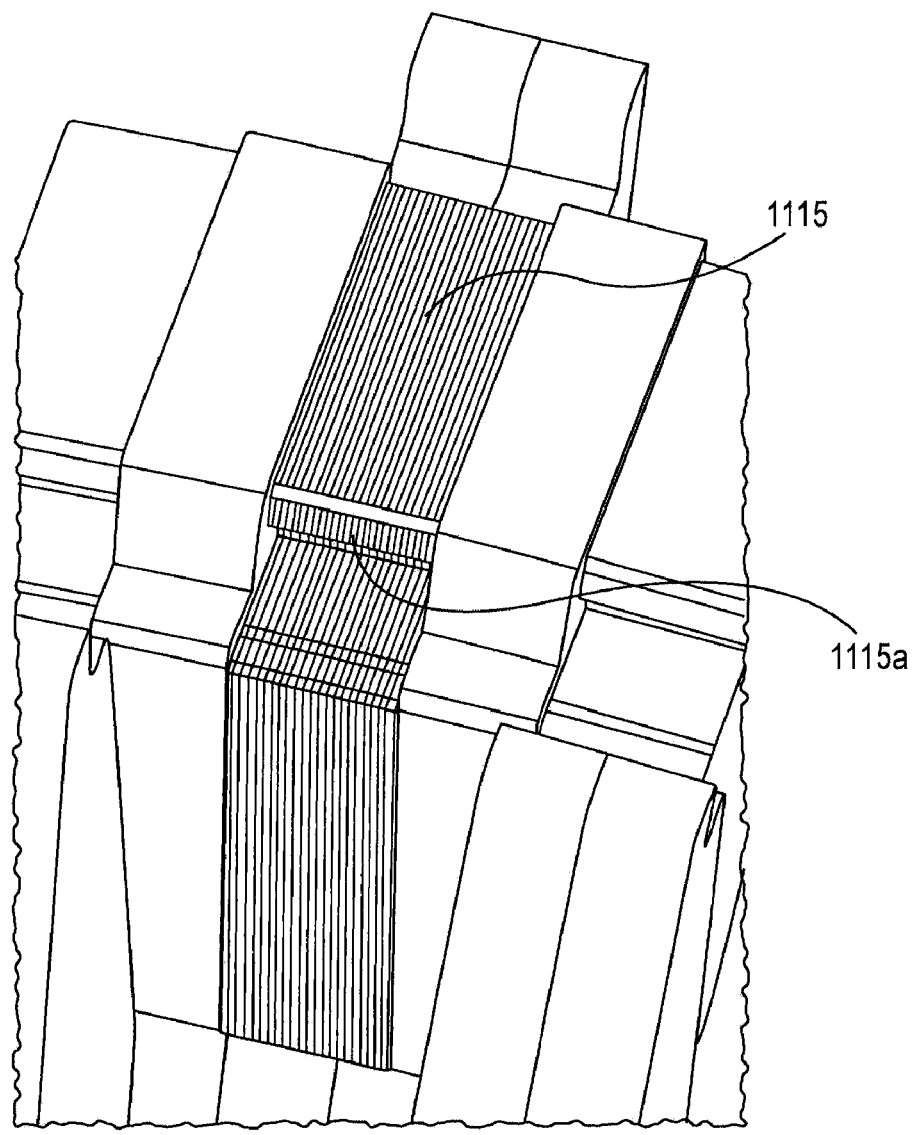

The shapes of the rotor portions 1110 for the exemplary device of FIGS. 12-14 are selected to enhance overall the strength and ease construction of the device 1100, among other things. For example, in one illustrative variation, as shown in FIG. 13, the flux conducting portions 1115 may comprise stacked laminated steel (or other flux conducting material) and having extension portions 1115a for securing the rotor to a hub having mating extensions (see e.g., FIG. 15A). In the embodiment of FIG. 13, assembly of the flux conducting portions 1115 is eased by stacking the laminations from the inner radius to the outer radius of the device 1100. Among other things, the orientation of the laminations may be varied to enhance flux transmission in the direction of flow across each flux conducting portion 1115 between the stator extensions 1121, 1122 (e.g., the planar surfaces of the laminations are parallel to the direction of flux transmission, thereby reducing eddy currents and other losses relating to operation in the absence of laminated parts.

In another illustrative variation, as shown in FIG. 14, the flux conducting portions 1115 are assembled using laminations oriented in a radial direction. Among other advantages, this approach eases assembly (e.g., by allowing each lamination to be identical) and enhances mechanical strength of the flux conducting portions (e.g., each lamination is mechanically secured by the hub a the extensions 1115a, rather than requiring a securing feature between laminations in the inner to outer radial direction, as may be needed for some assemblies of laminations for the exemplary variation of FIG. 13).

In yet another variation, the flux conducting portions 1115 are formed from powdered or amorphous metal, base steel, or other flux conducting material.

In some variations of devices in accordance with aspects of the present invention, cogging and noise reduction techniques are used for the device. For example, in some variations, when some of the rotor extensions 1121, 1122 are aligned relative to proximate stator flux conducting portions 1115 at a given rotational position of the stator/rotor 1120/1110, other rotor extensions 1121, 1122 are not so aligned relative to proximate flux conducting portions 1115, and vice versa when the other rotor extensions 1121, 1122 are aligned with corresponding flux conducting portions 1115. In other variations, the shapes and sizes of the flux conducting portions 1115 and/or magnet portions 1111, 1112 vary slightly about the radial direction of the device 1100, so as to reduce cogging and noise.

Figure 15A:
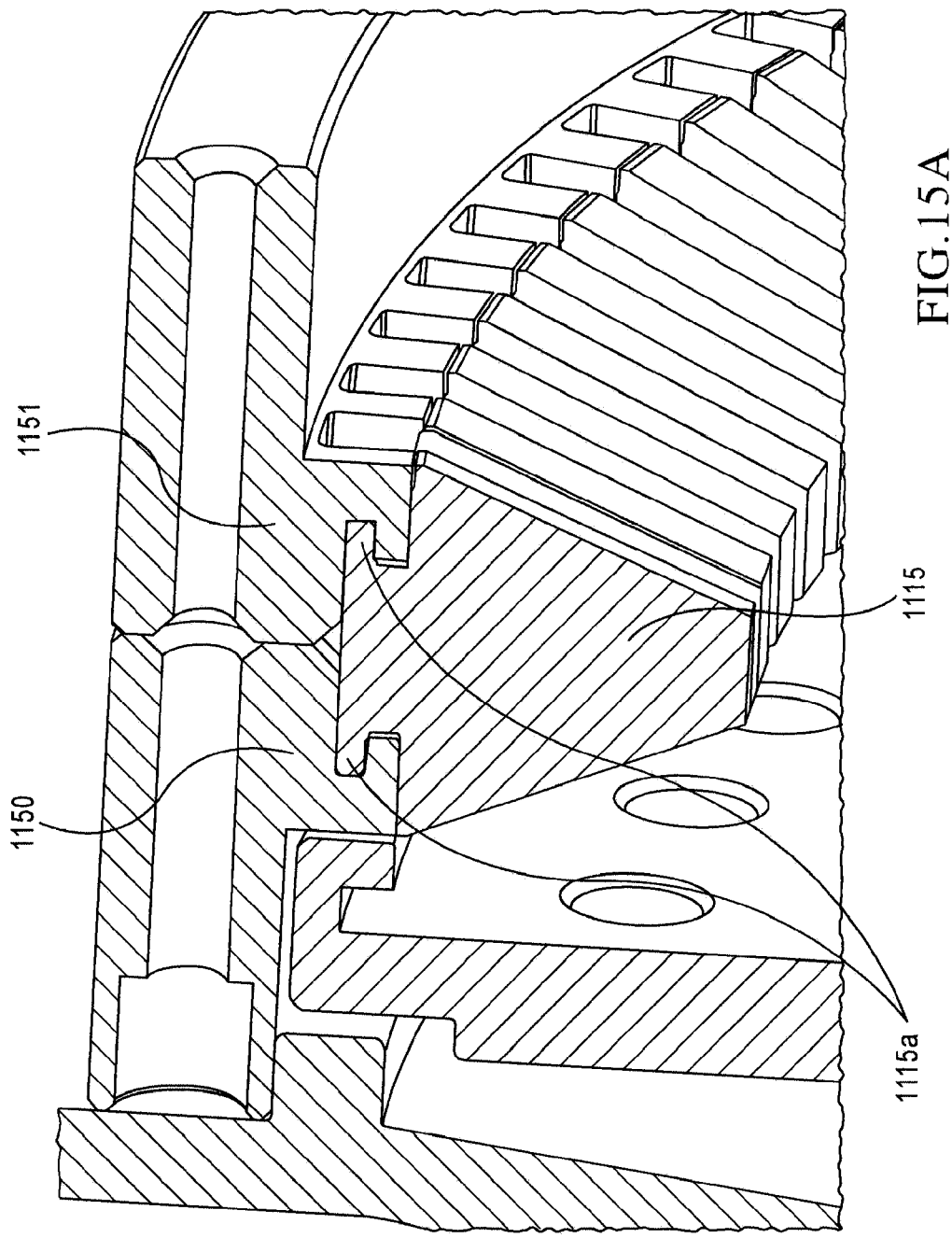

FIG. 15A shows an end view of an exemplary two piece ring 1150, 1151 for use in assembling flux conducting portions and/or magnets sandwiched therebetween 1115 having extension portions 1115a.

Figure 15B:
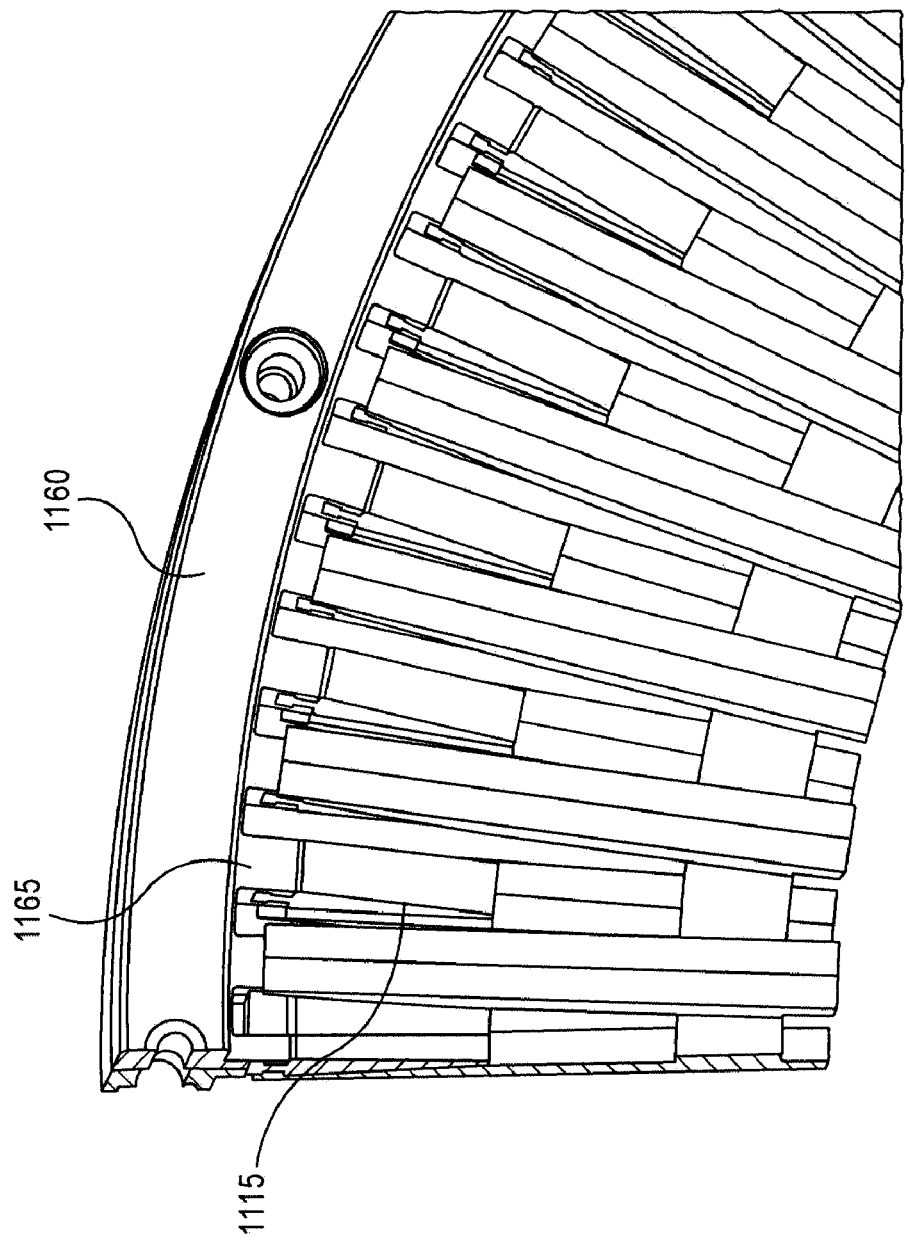

FIG. 15B shows a partial side view of the exemplary two piece ring 1150, 1151 of FIG. 15A. Hoop strength, a property of the ring 150, 1151 to resist initial binding loads occurring as a result of attraction of the magnet portions to the nearest flux conducting portions can be important in some variations of devices in accordance with aspects of the present invention to allow practical operation, particularly for high strength magnets and/or multiple phases and/or designs having higher axial thrust loads (see also, e.g., further discussion with respect to FIGS. 16J and 16K below).

FIGS. 16A-16K present cross-sectional views of several exemplary stator and rotor layouts, in accordance with aspects of the present invention.

FIG. 16A shows a variation having an outer diameter rotor and an inner diameter stator.

FIG. 16B shows a variation having an inner diameter rotor and an outer diameter stator.

FIG. 16C shows a variation having side by side rotor and stator.

FIG. 16D shows a variation having side by side rotor and stator, with a more compact width profile than the variation of FIG. 16C.

FIG. 16E shows a variation having an outer diameter rotor and inner diameter stator, with straight edge switches in the rotor.

FIG. 16F shows a variation having an outer diameter rotor and inner diameter stator, with serrated edge switches in the rotor.

FIG. 16G shows a variation having an outer diameter rotor and inner diameter stator, with wrap over top switches ("T-shaped") in the rotor.

FIG. 16H shows a variation having an outer diameter rotor and inner diameter stator, with a single direction axial thrust load in the stator switches.

Figure 16K:
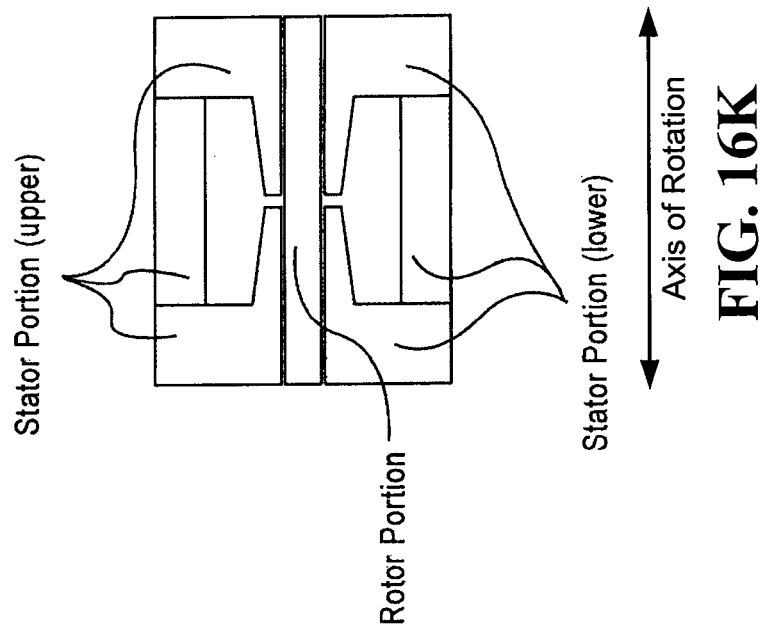
Figure 16J:
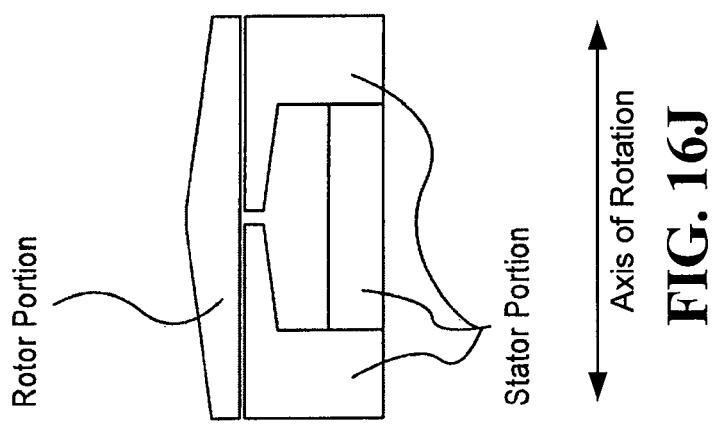
Figure 16I:
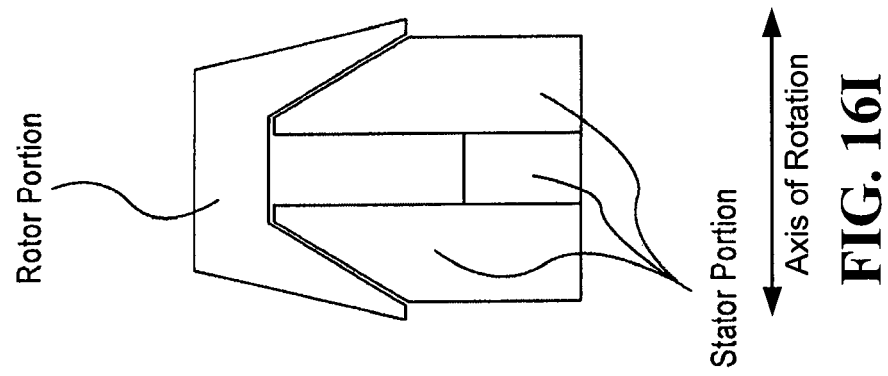

FIG. 16I shows a variation having an outer diameter rotor and inner diameter stator, with wrap over top switches (modified "T-shaped") in the rotor.

FIG. 16J shows a variation having an outer diameter rotor and an inner diameter stator, with a no thrust load configuration in the rotor switches.

FIG. 16K shows a variation having a rotor sandwiched between two stator portions in a compact no axial load arrangement for use, for example, in two phase applications. For example, the upper stator portion can include flux conducting portions out of phase with rotor magnet portions when the rotor magnet portions are in phase with the lower stator portion, and vice versa. The rotor portion may be fixably secured and allowed to move rotationally relative to the stator portions, for example, via use of cantilevering features incorporated in or attached to the rotor. Among other things, this approach reduces cogging in operation of the device.

Variations such as those shown in FIGS. 16J and 16K have, among other things, an advantage of reduced axial thrust loads on bearings on which the rotor rides, relative to variations like those shown in FIGS. 16A-16I.

Figure 17:
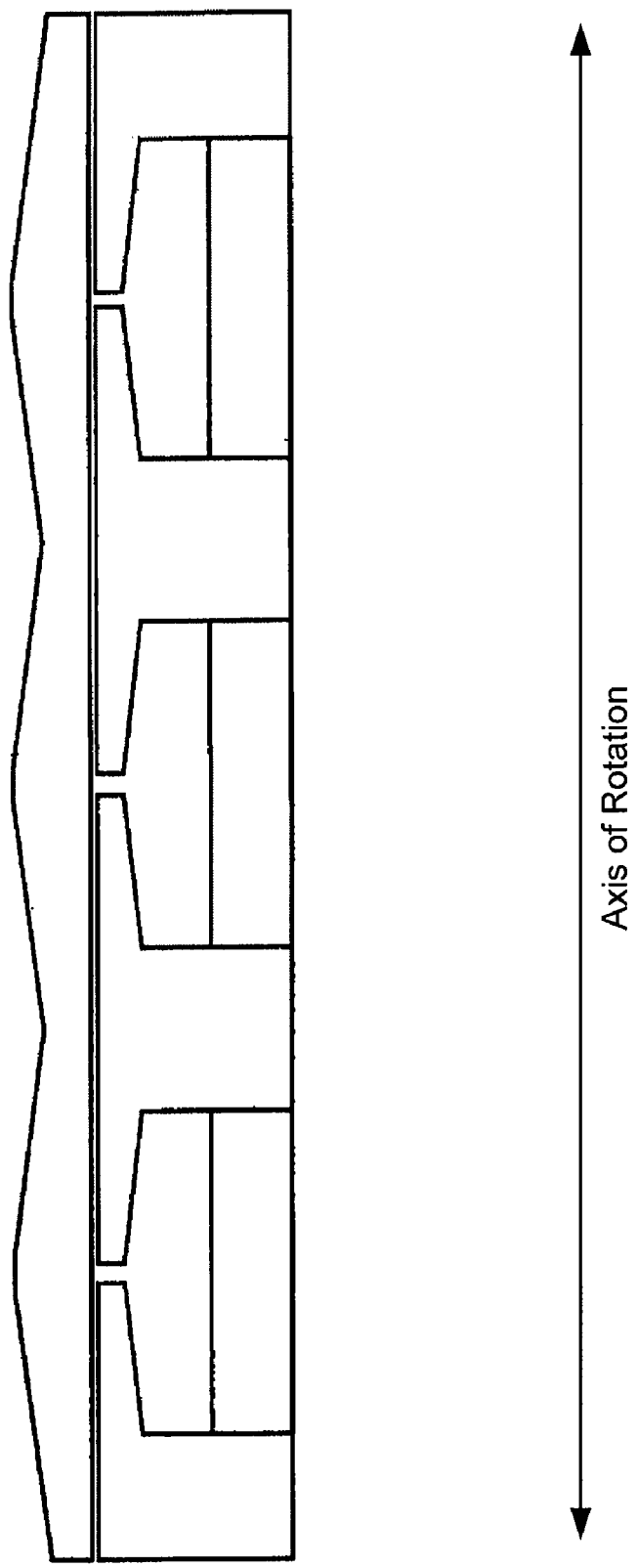
FIG. 17 shows a representative view of a three phase device based on a combination of three of the stators/rotors of FIG. 16J.

Some of the variations shown in FIGS. 16A-16K may be combined so as to produce multiple phase devices, with stator and/or rotor elements overlappingly used so as to reduce size and/or increase efficiency and/or address cogging or noise, for example. FIG. 17 shows a representative view of a three phase device based on a combination of three of the stators/rotors of FIG. 16J.

Disk Type Device for Conventional Alternator and Other Add-On Applications

Figure 18:
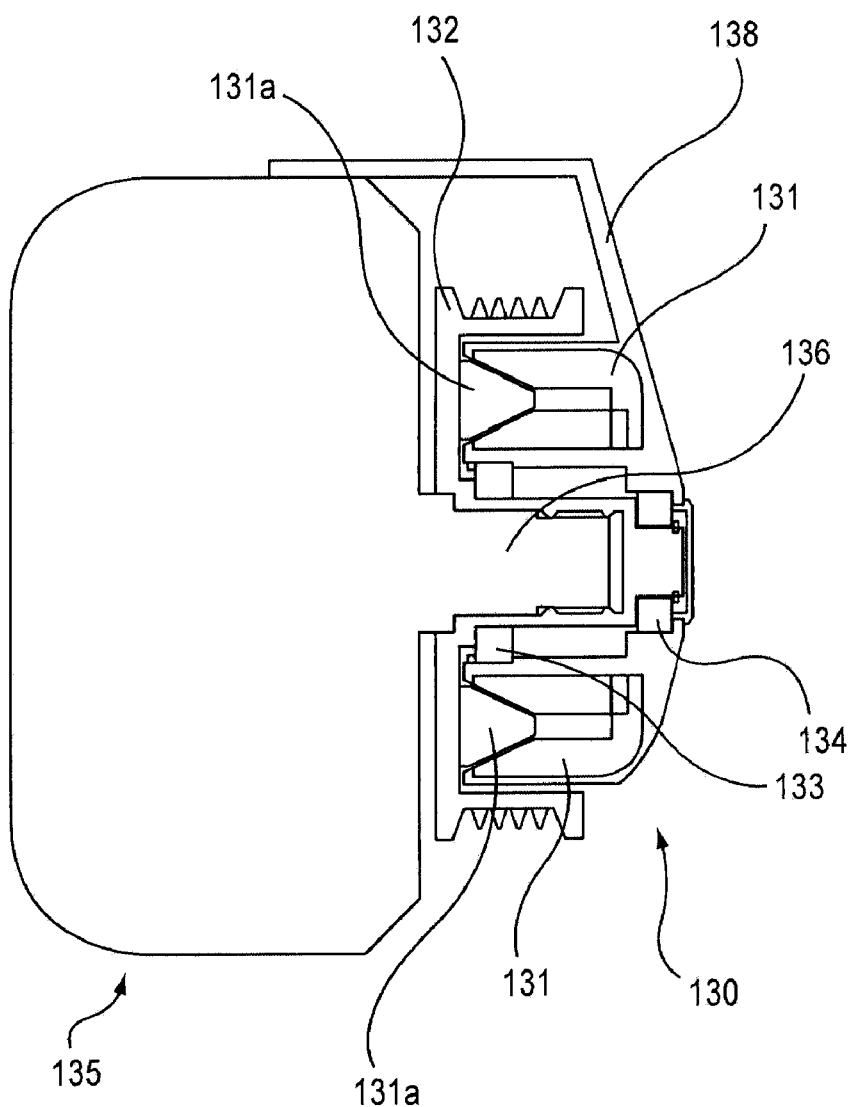
FIGS. 18-21 present variations of exemplary disk type devices that are attachable to an existing device, in accordance with aspects of the present invention.
Figure 19:
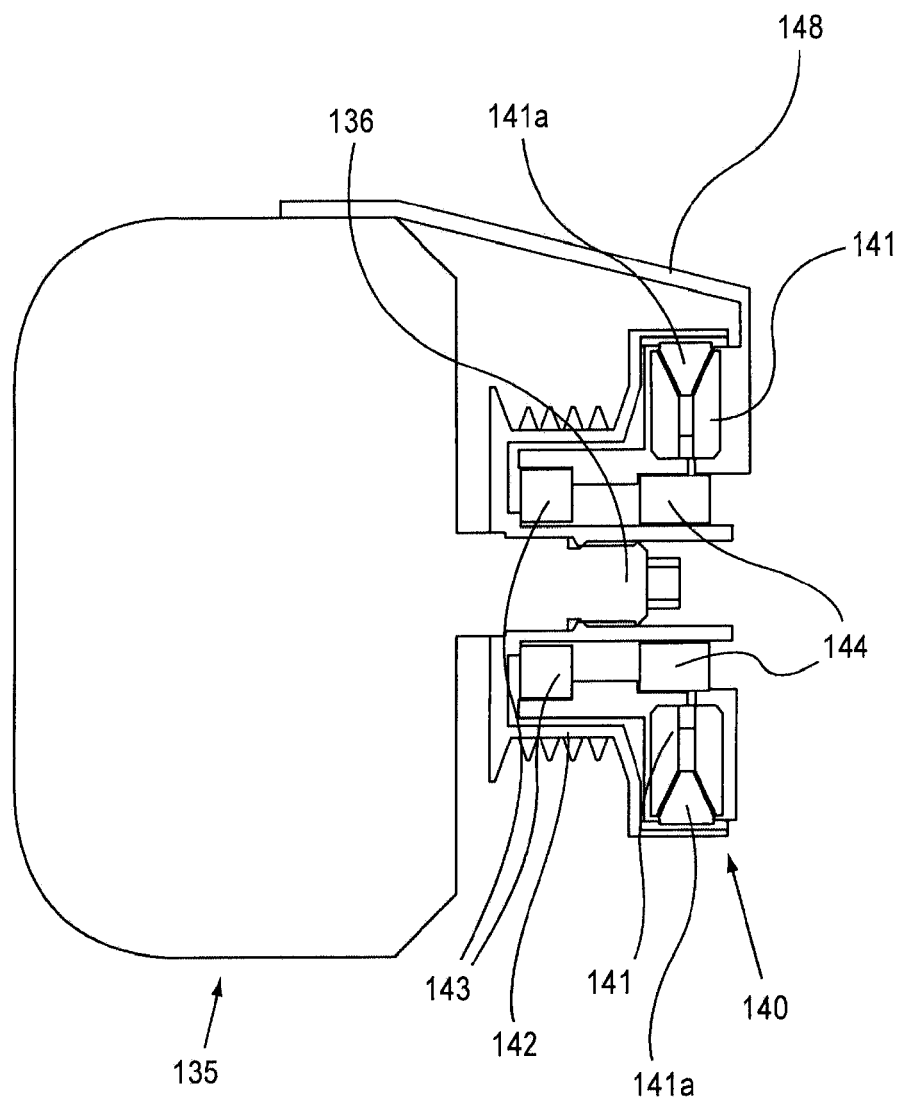
Figure 20:
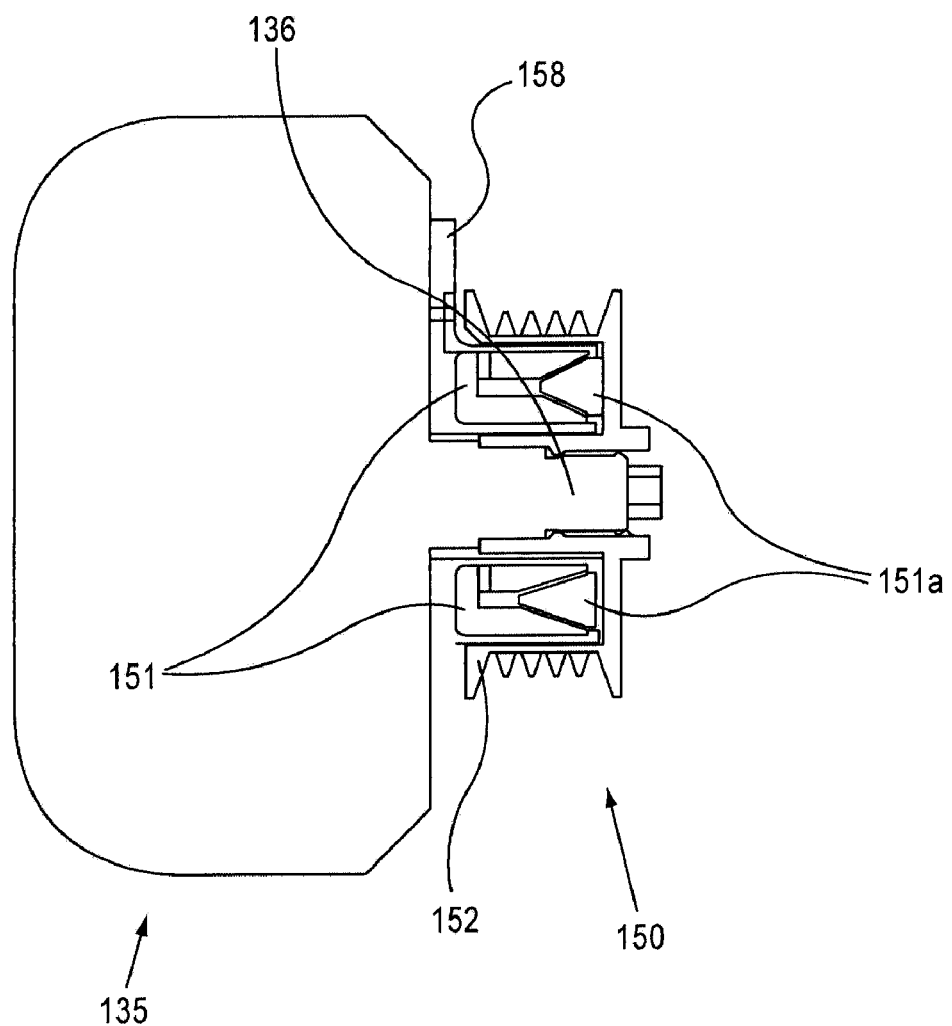

FIGS. 18-20 present variations of exemplary generally disk type devices that are attachable to an existing device, such as a pulley driven alternator, so as to provide supplemental or alternative power output.

In the exemplary variation of FIG. 18, the present device 130 includes a stator and rotor 131, 131a having a cross-sectional shape that is similar to that shown in FIG. 16C. As further shown in FIG. 18, the rotor portion 131a is attached to the pulley body portion 132 of the present device 130. The pulley body portion 132 is fixably attached, such as by compression or threaded fit to the shaft 136 of an existing device 135, such as an existing art alternator, to which the present device 130 may be attached, for example. The stator portions 131 of the device 130 are contained within a fixable housing portion 138 of the present device, such as a housing portion 138 being attachable, for example, so as to fix the position of the housing portion 138 relative to the existing device 135.

In operation, for the present device 130 of FIG. 18, rotational motion of the pulley body portion 132, including the rotor portion 131a, occurs relative to the fixed position of the fixable housing portion 138, including the rotor portion 131. Frictional engagement of the pulley body portion 132 relative to fixable housing portion 138 may be reduced, such as by use of bearings 133, 134 or other friction reducing mechanisms or methods.

Rotational motion of the rotor portion 131a with the pulley body portion 132 produces an output (e.g., electrical power) generated via a coil located in the stator portion 131, which is housed in the fixable housing portion 138. This output may be transmitted (e.g., via an electrical coupling) for supplemental or other use. For example, if the present device 130 is attached to conventional alternator in a vehicle, the present device 130 may generate sufficient electrical output for operating relatively low demand vehicle operations, such as providing operating engine electrical power and low demand vehicle electrical needs (e.g., radio operation, instrument power). For these uses, the conventional alternator may be placed in a state so as not to provide output (e.g., power output placed in an electrical "open" condition), so that driving power for operation of the existing art alternator and the present device 130 are minimized. For higher demand electrical needs (e.g., starting electrical power; operation at night and in inclement weather, requiring lights and/or wiper motor power), the conventional alternator could be enabled to produce power (e.g., by coupling the power output from the existing art alternator to the power need).

The exemplary variation of FIG. 19 is similar in operation to that of FIG. 18, but the present device 140 includes a rotor and stator having a cross-section 141 that is similar to that shown in FIGS. 16A and 16B. As further shown in FIG. 19, the rotor portion 141a is attached to the pulley body portion 142 of the present device 140. The pulley body portion 142 is fixably attached, such as by compression or threaded fit to the shaft 136 of an existing device 135, such as a conventional alternator, to which the present device 140 is attached. The stator portions 141 of the device 140 are contained within a fixable housing portion 148, such as a housing attachable to the device 135 to which the present device 140 is to be attached, such as via attachment mechanism 148.

Operation of the device 140 of FIG. 19 is similar to that of FIG. 18. The device 140 of FIG. 19 has a larger overall size relative to the device 130 of FIG. 18 (due, for example, to the placement of the stator/rotor portions 141/141a in the device 140 of FIG. 19 relative to the placement of the corresponding portions 131/131a in the device 130 of FIG. 18), but the arrangement of FIG. 19 allows greater sized stator/rotor portions 141/141a to be used, relative to those in FIG. 18 (e.g., the stator/rotor portions 141/141a are not constrained, sizewise, by being essentially contained within the pulley portion 142, as is the case in FIG. 18), thereby potentially allowing greater power to be produced by the device 140 of FIG. 19, relative to the device 130 of FIG. 18.

Similar to the exemplary variation of FIG. 18, in the exemplary variation of FIG. 20, the present device 150 includes a rotor and stator having a cross-section 151 that is similar to that shown in FIG. 16C. As further shown in FIG. 20, the rotor portion 151a is attached to the pulley body portion 152 of the present device 150. The pulley body portion 152 is fixably attached, such as by compression or threaded fit to the shaft 136 of an existing device 135, such as a conventional alternator, to which the present device 150 is attached. The stator portions 151 of the device 150 are attached to the existing device 135, such as to its housing by rotor/stator housing attachment mechanism 158.

Operation of the device 150 of FIG. 20 is similar to that of FIG. 18 and has similar limitations to the device 130 of FIG. 18, relative to the device 140 of FIG. 19. However, the device 150 of FIG. 20 has a generally smaller overall profile compared to the device 130 of FIG. 18, and, unlike the devices 130, 140 of FIGS. 18 and 19, respectively, the device 150 of FIG. 20 requires no use of bearings (e.g., bearings 133, 134 of FIGS. 18 and 143, 144 of FIG. 19). Like the devices 130, 140 of FIGS. 18 and 19, respectively, the device 150 of FIG. 20 requires relatively high tolerances in the attachment of the rotor/stator housing 158 to the existing device 135, to ensure that the rotor portions 151a and the stator portions 151, which are fixably held relative to the existing device shaft 136 and the housing of existing device 135, respectively, are maintained at very precise relative positions for operation.

Figure 21A:
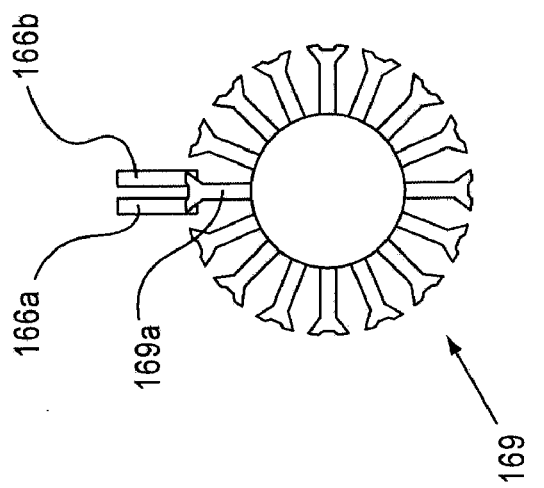
Figure 21:
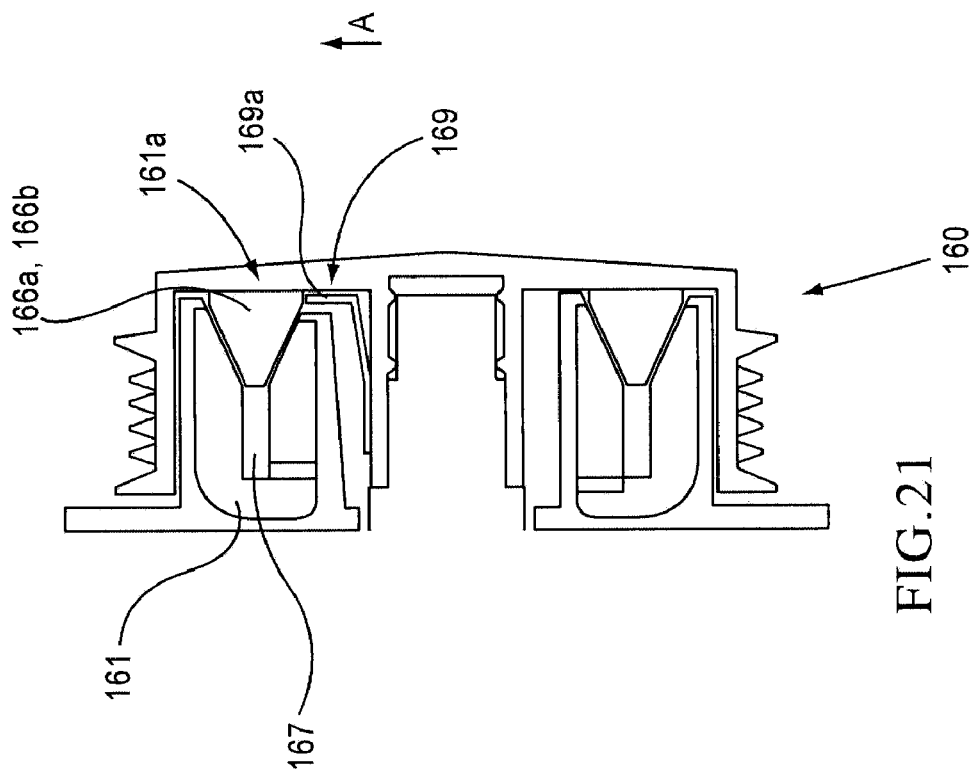

FIGS. 21 and 21A show an additional feature usable with one or more of the devices of the variations of FIGS. 18-20, among other similar devices. In the exemplary arrangement shown in FIG. 21, the power output device 160 is similar to the device 150 of FIG. 20. However, an additional feature 169 is included as shown. The feature 169 has an overall general "hat-shape," with an end profile as shown in FIG. 21A. The feature 169 is designed to address the reduced need for power relative to output typical at higher rotational speeds (high RPM) of the existing device (not shown in FIG. 21; see, e.g., device 135 of FIG. 20).

The feature 169 comprises a flux conducting material (e.g., steel or iron) that is oriented such that the extensions 169a (also interchangeably referred to herein as "lams") align with pairs of flux conducting portions 166a, 166b of the rotor 161a (see also, for example, various view of exemplary flux conducting portions 1115 shown in FIGS. 12-14). In operation, in order to maintain a relatively constant output as RPM increases, the extensions 169a selectively extend (e.g., in the direction A for the extension 169a shown in FIG. 21) and contact or come into close proximity to the corresponding rotor flux conducting portions (e.g., flux conducting portions 166a, 166b shown in FIGS. 21 and 21A), thereby "shorting" the flux conducting path therebetween, such that no reduced flux travels through the stator portion 161 via either of the pair of "shorted" flux conducting portions (e.g., 166a, 166b). As a result, the coil 167 is not energized, as the flux travels through the "shorted" path, and output from the device 160 is correspondingly reduced.

The extension 169a may selectively extend, for example, as a result of centripetal force on the extension 169a, causing a radially outward extension (e.g., in the direction A for the extension 169a shown in FIG. 21). The extension 169a may be biased so that the extension 169a normally does not contact the corresponding flux conducting portions 166a, 166b of the rotor portion 161a proximate to which the extension 169a is positioned. When a selected speed, producing an appropriate centripetal force is reached, the biasing of the extension 169a is overcome, allowing the extension 169a to contact the flux conducting portion 166a, and thereby "shorting" the two flux conducting portions 166a, 166b (the adjacent flux conducting portions 166a, 166b transmit flux in opposite directions, thereby canceling the flux transmission between the two). By varying the weight, thickness, and/or other properties of each extension, the "shorting" can vary with rotational velocity, for example, such that the number of extensions shorting the flux conducting portions 166a, 166b in the device 160 increases with velocity and thereby maintains a relatively constant output from the device 160.

Example variations and implementations of the present invention have now been described in accordance with the above advantages. It will be appreciated that these examples are merely illustrative of aspects of the present invention. Many variations and modifications will be apparent to those skilled in the art.

In places where the description above refers to particular implementations of electrical output generating devices and/or electrically driven devices, it should be readily apparent that a number of modifications may be made without departing from the spirit thereof and that these aspects, implementations, and variations may be applied to other electrical output generating devices and/or electrically driven devices. The presently disclosed aspects, implementations, and variations are therefore to be considered in all respects as illustrative and not restrictive.

The invention claimed is:

1. An electrical machine, comprising:
   a coil;
   a rotor assembly rotatable about an axis, the rotor comprising an alternating plurality of magnet portions and plurality of flux conducting portions, each of the plurality of magnet portions having a first end with a first polarity and a second end with the opposite polarity and being oriented in a circumferential direction, pairs of magnet portions sandwiching flux conduction portions, each pair of sandwiching magnet portions being oriented such that each sandwiched flux conducting portion is sandwiched between either two first ends or two second ends of the pair of sandwiching magnet portions; and
   a stator assembly having first and second sets of stator flux conductor extensions, each of the stator flux conductor extensions having a stator surface facing the rotor;
   wherein rotating the rotor assembly about the axis alternates the rotor assembly between a first position and a second position;
   wherein, in the first position, magnetic flux flows in a first path in a first direction through each of the stator flux conductor extensions and the rotor;
   wherein, in the second position, magnetic flux flows in a second path in a second direction through each of the stator flux conductor extensions and the rotor, the first direction being substantially opposite the second direction;
   wherein the first set of stator flux conductor extensions are located on a first stator portion,
   wherein the second set of stator flux conductor extensions are located on a second stator portion, and
   wherein the first stator portion is rotatable about the axis relative to the second stator portion.

2. The electrical machine of claim 1, wherein the first stator portion is rotatable about the axis relative to the second stator portion in order to vary an output of the electrical machine.

3. The electrical machine of claim 1, wherein the stator comprises at least one of laminated steel, powdered metal, or amorphous metal.

4. The electrical machine of claim 1, wherein the coil comprises tape wound material.

5. The electrical machine of claim 1, wherein the rotor comprises at least one of: the plurality of magnet portions and the plurality of flux conducting portions being attached to a ring, or the plurality of magnet portions and the plurality of flux conducting portions being alternatingly sequentially attached to one another to form a ring.

6. The electrical machine of claim 1, wherein the magnet portions each comprise a section of a magnetizable ring having an induced permanent magnetic pole thereon, and wherein the flux conducting portions comprise unmagnetized sections of the magnetizable ring.

7. The electrical machine of claim 1, wherein the plurality of flux conducting portions are injection molded with the plurality of magnet portions.

8. An electrical machine, comprising:
   a coil;
   a substantially ring-shaped rotor assembly rotatable about an axis and at least partially surrounding the coil, the rotor assembly having at a peripheral location an attached plurality of magnet portions alternating with an attached plurality of flux conducting portions,
   wherein each of the plurality of magnet portions has a first end with a first polarity and a second end with opposite polarity, each of the plurality of magnet portions being oriented along the peripheral location such that the first end of each magnet portion points toward the first end of the sequential magnet portion in a first circumferential direction, and the second end of each magnet portion points toward the second end of the sequential magnet portion in a second circumferential direction opposite the first circumferential direction; and
   a stator assembly at least partially surrounding the coil, the stator assembly having first and second sets of stator flux conductor extensions, each of the stator flux conductor extensions having a stator surface facing the rotor;
   wherein the rotor assembly is rotatable about the axis between a first position and a second position;

wherein, in the first position, each of the stator surfaces of the first set of stator flux conductor extensions faces one of the plurality of rotor flux conducting portions located between two first ends of successive magnet portions, and each of the stator surfaces of the second set of stator flux conductor extensions faces one of the plurality of rotor flux conducting portions located between two second ends of successive magnet portions;

wherein, in the second position, each of the stator surfaces of the first set of stator flux conductor extensions faces one of the plurality of rotor flux conducting portions located between two second ends of successive magnet portions, and each of the stator surfaces of the second set of stator flux conductor extensions faces one of the plurality of rotor flux conducting portions located between two first ends of successive magnet portions, wherein the first set of stator flux conductor extensions are located on a first stator portion, wherein the second set of stator flux conductor extensions are located on a second stator portion, and wherein the first stator portion is rotatable about the axis relative to the second stator portion.

9. The electrical machine of claim 8, wherein, in the first position, magnetic flux flows through the stator in a first path, and wherein, in the second position, magnetic flux flows through the stator in a second path, the first path being substantially opposite the first path.

10. The electrical machine of claim 8,
wherein rotating the first stator portion relative to the second stator portion causes an increase in power generated in the coil of the electrical machine responsive to rotation of the rotor assembly.

11. The electrical machine of claim 8, wherein the stator comprises at least one of laminated steel, powdered metal, or amorphous metal.

12. The electrical machine of claim 8, wherein the coil comprises tape wound material.

13. The electrical machine of claim 8, wherein the rotor comprises at least one of the plurality of magnet portions and the plurality of flux conducting portions attached to a ring, or the plurality of magnet portions and the plurality of flux conducting portions being attached to one another to form a ring.

14. The electrical machine of claim 8, wherein the magnet portions each comprise a section of a magnetizable ring having an induced permanent magnetic pole thereon, and wherein the flux conducting portions comprise unmagnetized sections of the magnetizable ring.

15. An electrical machine, comprising:
a coil;
a rotor assembly at least partially encompassing the coil and rotatable about an axis, the rotor comprising a plurality of non-rectilinear magnet portions alternating with a plurality of non-rectilinear flux conducting portions;
wherein each of the plurality of magnet portions has a first end having a first polarity and a second end having the opposite polarity, each of the plurality of magnet portions being oriented such that the first end of each magnet portion points toward the first end of the sequential magnet portion in a first circumferential direction, and such that the second end of each magnet portion points toward the second end of the sequential magnet portion in a second circumferential direction opposite the first circumferential direction;
a stator assembly having first and second sets of stator flux conductor extensions, each of the stator flux conductor extensions having a stator surface facing the rotor;

wherein the rotor assembly is rotatable about the axis between a first position and a second position;

wherein, in the first position, magnetic flux flows in a first path through each of the stator flux conductor extensions and the rotor in a first direction;

wherein, in the second position, magnetic flux flows in a second path through each of the stator flux conductor extensions and the rotor in a second direction, the second direction being substantially opposite the first direction, wherein the first set of stator flux conductor extensions are located on a first stator portion, wherein the second set of stator flux conductor extensions are located on a second stator portion, and wherein the first stator portion is rotatable about the axis relative to the second stator portion.

16. The electrical machine of claim 15, wherein each of the plurality of magnet portions is generally arrowhead shaped.

17. The electrical machine of claim 15, wherein each of the plurality of magnet portions is disposed radially at a greater distance from the axis than the coil.

18. The electrical machine of claim 15, wherein each of the plurality of magnet portions is disposed at a lesser radial distance from the axis than the coil.

19. The electrical machine of claim 15, wherein each of the plurality of magnet portions is disposed at a radial distance from the axis approximately equal to the radial distance of the rotor assembly from the axis.

20. The electrical machine of claim 15, wherein the device is coupled to an apparatus to provide supplemental or alternative power output to the apparatus.

21. The electrical machine of claim 20, wherein each of the plurality of magnet portions is disposed radially at a greater distance from the axis than the coil.

22. The electrical machine of claim 20, wherein each of the plurality of magnet portions is disposed at a lesser radial distance from the axis than the coil.

23. The electrical machine of claim 20, wherein each of the plurality of magnet portions is disposed at a radial distance from the axis approximately equal to the radial distance of the rotor assembly from the axis.

24. The electrical machine of claim 20, wherein the electrical machine contains selectively extending extensions for adjusting the output of the device that extend to short together at least two flux conducting portions of the device.

25. The electrical machine of claim 20, wherein the apparatus is coupled to the device via a pulley.

26. The electrical machine of claim 25, wherein the device is smaller than the pulley and is mounted such that at least a portion of the device is inside the pulley.

27. The electrical machine of claim 25, wherein the device is larger than the pulley and is mounted such that at least one of the stator and rotator assemblies is outside of the pulley.

28. The electrical machine of claim 1, wherein each of the plurality of magnet portions is disposed at a greater radial distance from the axis than the coil.

29. The electrical machine of claim 1, wherein each of the plurality of magnet portions is disposed at a lesser radial distance from the axis than the coil.

30. The electrical machine of claim 1, wherein each of the plurality of magnet portions is disposed at a radial distance from the axis approximately equal to the radial distance of the rotor assembly from the axis.

31. The electrical machine of claim 1, wherein the first stator portion is rotatable about the axis relative to the second stator portion via a slot in the first stator portion in which a moveable pin is received, the moveable pin coupled to a motor to selectively rotate the first stator potion.

32. The electrical machine of claim 1, wherein the first set of stator flux conductor extensions and the second set of stator flux conductor extensions are separable by a plane passing through the axis.

33. A method for varying the output of an electrical machine, the method comprising:
- rotating a rotor assembly about an axis between a first position and a second position, the rotor comprising a plurality of magnet portions alternating with a plurality of flux conducting portions; and
- rotating a first stator portion of a stator assembly about the axis relative to a second stator portion of the stator assembly, the first stator portion comprising a first set of stator flux conductor extensions, the second stator portion comprising a second set of stator flux conductor extensions, and each of the stator flux conductor extensions having a stator surface facing the rotor;
- wherein, in the first position, magnetic flux flows through the first set of stator flux conductor extensions in a first direction,
- wherein, in the second position, magnetic flux flows through the first set of stator flux conductor extensions in a second direction, and
- wherein rotating the first stator portion relative to the second stator portion varies an output of the electrical machine.

34. The method of claim 33, wherein rotating the first stator portion relative to the second stator portion changes the RPM of the electrical machine.

35. The method of claim 33, wherein rotating the first stator portion relative to the second stator portion causes a change in power generated in a coil of the electrical machine responsive to rotation of the rotor assembly.

36. The method of claim 33, wherein the first stator portion is rotated relative to the second stator portion to maintain a constant voltage generated in a coil of the electrical machine despite variable speed rotation of the rotor assembly about the axis.

* * * * *